(12) United States Patent
Shaffer et al.

(10) Patent No.: US 6,477,374 B1
(45) Date of Patent: *Nov. 5, 2002

(54) APPARATUS AND METHOD FOR CALENDAR BASED CALL ROUTING

(75) Inventors: Shmuel Shaffer, Palo Alto; William J. Beyda, Cupertino, both of CA (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,716

(22) Filed: May 1, 1998

Related U.S. Application Data

(63) Continuation-in-part of application No. 08/778,525, filed on Jan. 3, 1997.

(51) Int. Cl.[7] .................................................. H04Q 7/20
(52) U.S. Cl. ........................ 455/445; 455/417; 455/461; 379/211
(58) Field of Search .................................. 455/445, 414, 455/415, 417, 461; 379/209, 210, 211, 220, 221, 100.08

(56) References Cited

U.S. PATENT DOCUMENTS

| | | |
|---|---|---|
| 4,597,105 A | 6/1986 | Freeburg |
| 4,989,230 A | 1/1991 | Gillig et al. |
| 5,018,187 A | 5/1991 | Marinho et al. |
| 5,257,406 A * | 10/1993 | Ito ............................... 455/445 |
| 5,263,177 A | 11/1993 | Schieve et al. |
| 5,268,957 A * | 12/1993 | Albrecht ..................... 379/209 |
| 5,329,578 A * | 7/1994 | Brennan et al. ............ 455/445 |
| 5,333,266 A * | 7/1994 | Boaz et al. ............ 379/100.08 |
| 5,448,569 A | 9/1995 | Huang et al. |
| 5,465,390 A | 11/1995 | Cohen |
| 5,513,246 A | 4/1996 | Jonsson et al. |
| 5,534,876 A | 7/1996 | Erickson et al. |
| 5,550,907 A * | 8/1996 | Carlsen ...................... 379/220 |
| 5,561,845 A | 10/1996 | Bendixen et al. |
| 5,594,781 A | 1/1997 | Kozdon et al. |
| 5,734,709 A * | 3/1998 | DeWitt et al. .............. 379/220 |
| 5,752,191 A * | 5/1998 | Fuller et al. ................ 455/445 |
| 5,790,528 A | 8/1998 | Muszynski |
| 5,802,468 A | 9/1998 | Gallant et al. |
| 5,875,395 A | 2/1999 | Holmes |
| 5,903,642 A * | 5/1999 | Schwartz et al. ........... 379/209 |
| 5,905,789 A * | 5/1999 | Will ............................ 379/211 |
| 5,930,700 A * | 7/1999 | Pepper et al. ............... 455/414 |
| 6,014,564 A | 1/2000 | Donis et al. |
| 6,119,006 A | 9/2000 | Shaffer et al. |
| 6,125,278 A | 9/2000 | Wieczorek et al. |

FOREIGN PATENT DOCUMENTS

| | | | |
|---|---|---|---|
| EP | 0 369 535 | 5/1990 | |
| EP | 0 696 118 A2 | 2/1996 | |
| WO | WO 92/02105 | 2/1992 | |
| WO | WO 96/13951 | 5/1996 | |
| WO | WO 97/20423 | 6/1997 | ............ H04M/1/64 |

OTHER PUBLICATIONS

Copy of European Search Report for EP Appln. No.99108235.5; date search was completed: Jul. 28, 2000.

* cited by examiner

Primary Examiner—Nay Maung
Assistant Examiner—Quochien B. Vuong

(57) ABSTRACT

A telecommunications system is provided whereby call routing may be based on a pre-programmed calendar of time-date associations. Moreover, the routing may be selective, based on caller-identification information. In particular, when a call arrives at a messaging server (804), such as a PBX or TOL server, a LAN database is checked. The LAN database points to a calendar (916, 918) corresponding to the user. The calendar (918) is queried to determine the user's location. The caller ID information is checked to determine whether the caller is authorized for forwarding. If so, the call is forwarded based on the calendar.

25 Claims, 23 Drawing Sheets

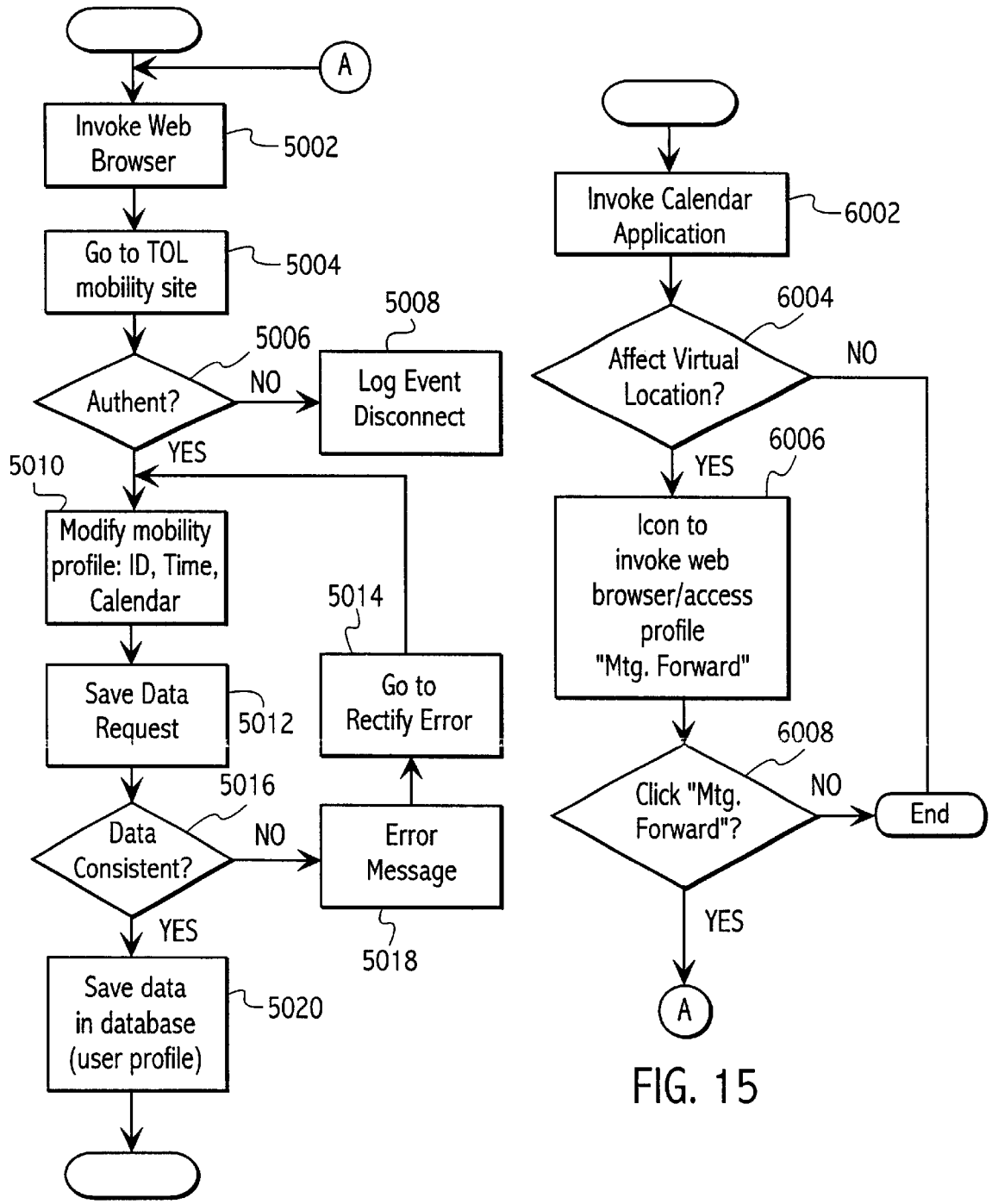

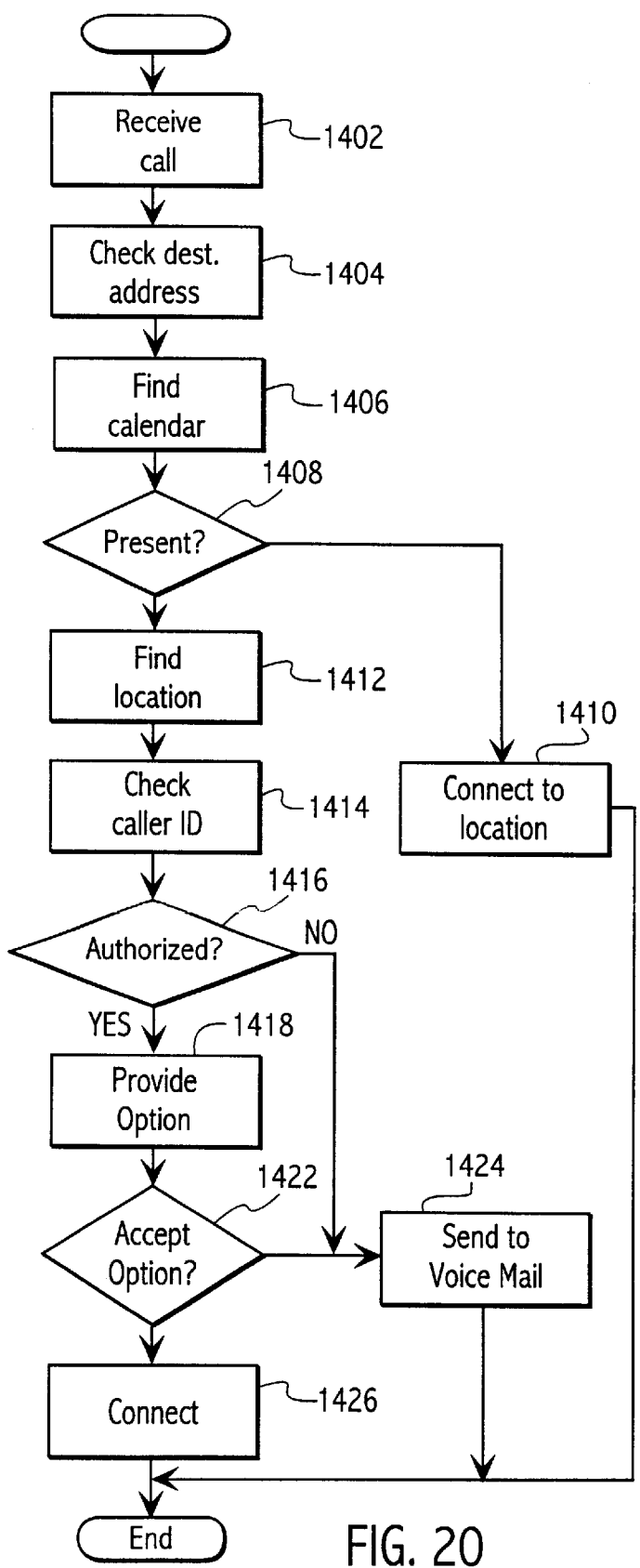
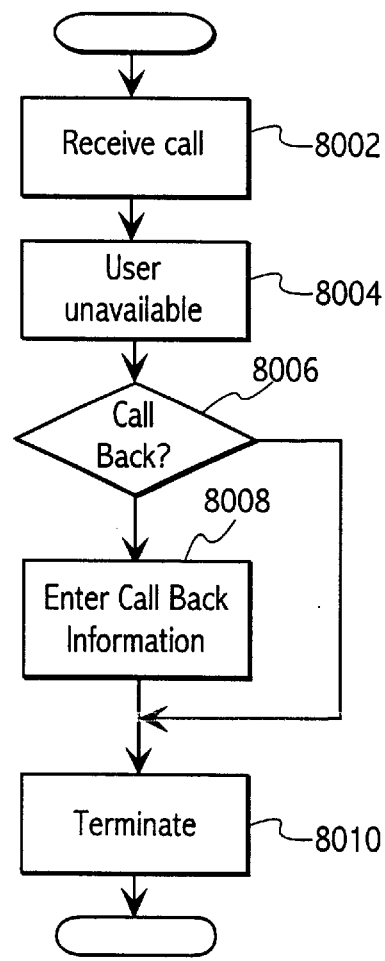
FIG. 20
FIG. 21A

APPARATUS AND METHOD FOR CALENDAR BASED CALL ROUTING

CROSS-REFERENCE TO RELATED CASE

This application is a continuation-in-part of SYSTEM AND METHOD FOR CELLULAR SMART SWITCHING, by Shmuel Shaffer and William Joseph Beyda, application Ser. No. 08/778,525, filed Jan. 3, 1997, which is hereby incorporated by reference in its entirety as if fully set forth herein.

BACKGROUND OF THE INVENTION

1. Field of the Invention

The present invention relates to communication systems and, more particularly, to an improved system and method for controlling call routing based on a user's calendar scheduling.

2. Description of the Related Art

During a call connecting a wireless communication device, such as a cellular telephone, with another telephone, the wireless communication device may cross from the domain of one wireless network to an independent wireless network. Such networks may comprise a company's private cellular telephone network ad the public cellular telephone network, for example. Thus, to complete the call, the wireless communication device must be capable of being used in both the company's internal wireless system and in the public system, and accommodation must be made for controlling hand-offs from one network to the other.

Hand-off of a telephone call from the domain of the first wireless network to the domain of the second wireless network may be made via a control link shared between central processing units of the two networks. Using the control link, the two wireless networks are able to negotiate feasibility and operations of hand-off as described, for example, in EIA/TIA interim standard IS-42.2-B, "Cellular Radio Telecommunications Intersystem Operations: Intersystem Hand-Off," which is hereby incorporated by reference. While ideally, hand-offs from one network to another are imperceptible to the user, in practice, hand-offs frequently introduce extraneous clicks and temporary loss of signal.

Frequently a user of the wireless communication device is required to travel from one company site to one or more other company sites, which can cause the wireless communication device to repeatedly switch back and forth between the public and private systems. This can cause unnecessary hand-offs, particularly since typical systems assume that a private wireless system, free of call charges, is preferable to a public system, even though the public systems typically charge a per call access fee. In such systems, a hand-off is always made to the private system, whether or not it is the most efficient in terms of cost or signal quality.

This situation is illustrated more clearly with regard to FIG. 1. In FIG. 1, an exemplary two-network wireless communication system 100 is shown. A private company wireless system is installed in buildings 104, 106 and 108. As illustrated, each building 104, 106, 108 is associated with its own cell or service area 110a, 110b, and 110c, respectively. Overlapping the private wireless system is a public wireless system 102 having multiple cells, only two of which, 102a and 102b, are shown.

As illustrated by the dashed line in FIG. 1, a user can travel from building 104 to building 108, crossing through cell areas 110a, 102a, 110b, 102b and 110c. Assuming that the user begins executing a telephone call in building 104, the user's call will be serviced by the private wireless network so long as he is within region 110a. As soon as the user leaves region 110a, he will be transferred to the public wireless carrier (so long as he is in region 102a). As the user approaches the vicinity of building 106, he will re-enter into the service area of the private wireless network as represented by cell 110b. His call will then be transferred back to the private network. As soon as the user leaves the area surrounding building 106, his call will be transferred from the private network to the public wireless network as he enters region 102b. Finally, as he approaches building 108, his call will be transferred back to the private network as he enters region 110c.

By the time the user gets to building 108, he has been transferred four times, each time with a momentary loss of conversation, a change in signal quality and, with every transfer to the public wireless carrier, a new charge per call. Accordingly, a system and apparatus is desired which minimizes the number of unnecessary hand-offs between private and public wireless networks so as to minimize charges and enhance the quality of the call.

A similar difficulty arises in the context of ordinary (wired) telephone systems and Voice-Over Local Area Network (VOL) applications. In VOL systems, telephony applications are provided over a user's LAN. When the user leaves his desk or workstation, such as for a meeting, he typically travels to another location, such as a co-worker's office or a conference room, provided with a telephone or computer. In such cases, when the user receives a message, he must be tracked down, either manually by a secretary or via a predetermined messaging sequence. For example, the telephone system may, after failing to locate the user at his "home" location, sequentially call a pager, cell phone, or home phone to reach the user. Alternatively, the user may manually input a "call forwarding" number.

Such systems, however, are inefficient in that they are not likely to regularly catch the user on the first attempt or are dependent on the user remembering to leave a call forwarding number. Accordingly, there is a need for a system which is configured to forward calls and messages based on a user's schedule.

SUMMARY OF THE INVENTION

The above-described problems are overcome in large part by a system and method according to the present invention in which a user's access patterns are accounted for in deciding to switch between the private and public wireless networks. A system and method according to one embodiment of the present invention includes monitoring a location of a wireless communication device within a plurality of regions serviced by a plurality of wireless systems, e.g., a first region serviced by a first wireless communication system and a second region serviced by a second wireless communication system. The first and second regions have an overlapping region which could be serviced by both networks. The system predicts the future location of the wireless communication device within the first and second regions based on the monitoring of the previous locations of the wireless communication device. When the wireless communication device is detected as being within the overlapping region, the system determines whether to transfer an active connection between the wireless communication device and one of the networks to the other network based on the monitoring information.

In one embodiment, past patterns of usage of the wireless communication device within the first and second regions are identified and used to predict a future location based on the past pattern. In another embodiment, a calendar of predetermined time-location associations is input into a controller associated with the wireless communication device, and the prediction is based on an actual location and current time being compared with the values input into the calendar.

A method according to another embodiment of the invention comprises compiling a database of time-location associations of a wireless communication device within a first region serviced by a first wireless communication system and a second region serviced by a second wireless communication system. The first region and second regions have a predetermined overlapping region. The method further comprises detecting when the wireless communication device is present within the overlapping region during an active connection and predicting a future location of the wireless communication device within the first region or the second region during the active connection. Finally, the method comprises determining whether to transfer the active connection between the wireless communication device and the first or second wireless communication systems to the other when the wireless communication device is detected as being within the overlapping region.

A wireless telecommunication system according to an embodiment of the present invention comprises a first wireless network providing service over a first predetermined region and comprising a first switching office, and a second wireless telephone network providing service over a second predetermined region and comprising a second switching office. The first predetermined region and the second predetermined region overlap in a third predetermined region. A wireless communication device is configured for use in both networks. The second switching office comprises a memory unit configured to store a database of time-location associations related to a presence of the communication device in either the first predetermined region or the second predetermined region. The second switching office also includes a wireless switching control unit coupled to the database, and configured to access the database when the communication device is detected within the third predetermined region and to transfer an active call between the networks based on the time-location associations.

According to a further embodiment of the invention, a telecommunications system is provided whereby call routing may be based on a pre-programmed calendar of time-date associations. Moreover, the routing may be selective, based on caller-identification information. In particular, when a call arrives at a messaging server, such as a PBX or TOL server, a LAN database is checked. The LAN database points to a calendar corresponding to the user. The calendar is queried to determine the user's location. The caller ID information is checked to determine whether the caller is authorized for forwarding. If so, the call is forwarded based on the calendar.

BRIEF DESCRIPTION OF THE DRAWINGS

A better understanding of the present invention is obtained when the following detailed description is considered in conjunction with the following drawings in which:

FIGS. 11, 12A–B and 13A–F, are diagrams illustrating user interfaces according to embodiments of the invention;

FIGS. 14–16 are flowcharts illustrating operation of embodiments of the present invention;

FIGS. 17–20 are flowcharts illustrating operation of another embodiment of the present invention; and FIGS. 21A–C are flowcharts illustrating call back according to an embodiment of the present invention.

DETAILED DESCRIPTION OF THE INVENTION

Figure 1:
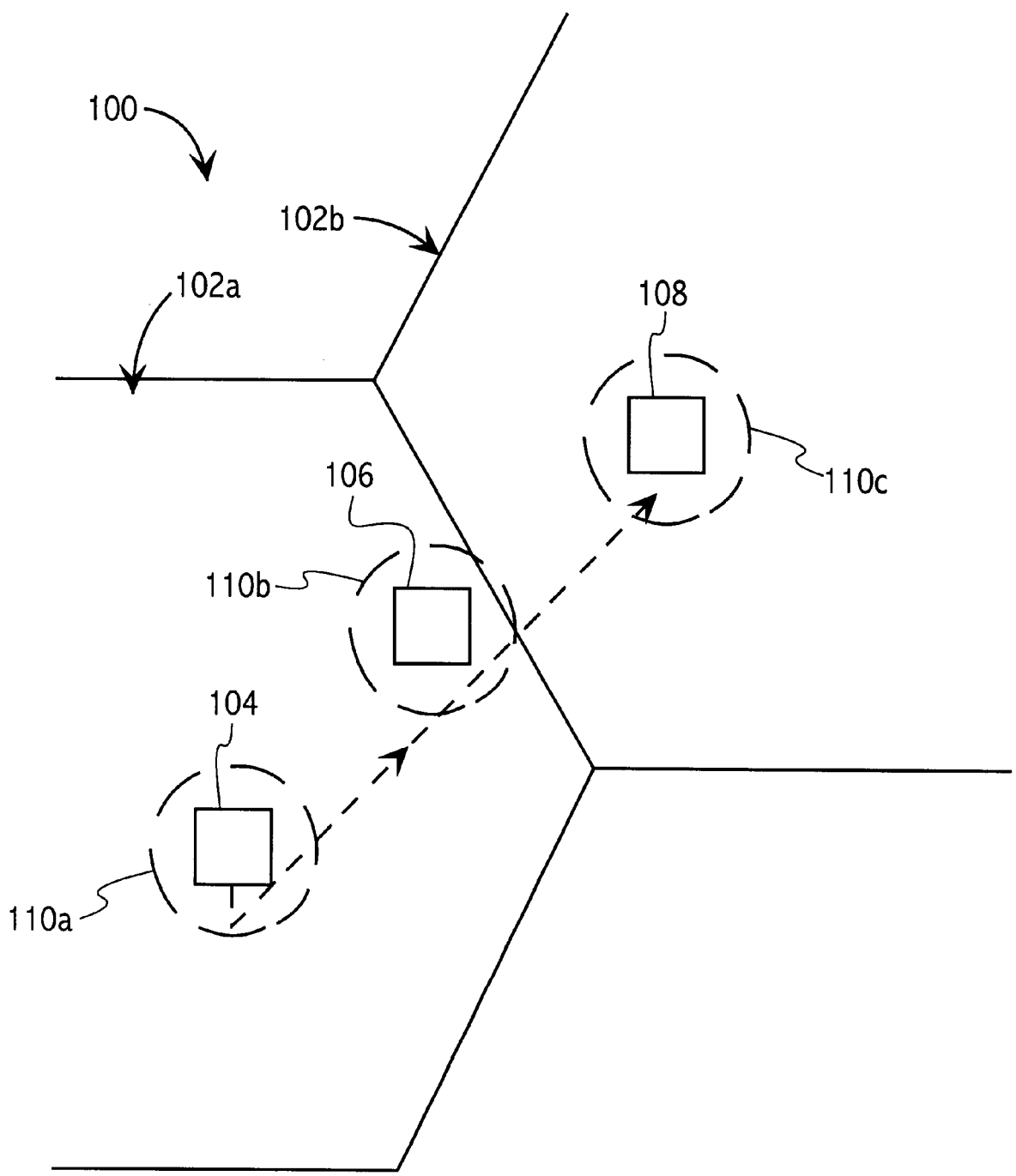
FIG. 1 is a diagram illustrating an exemplary two-network wireless system and the movement of a user therein.
Figure 2:
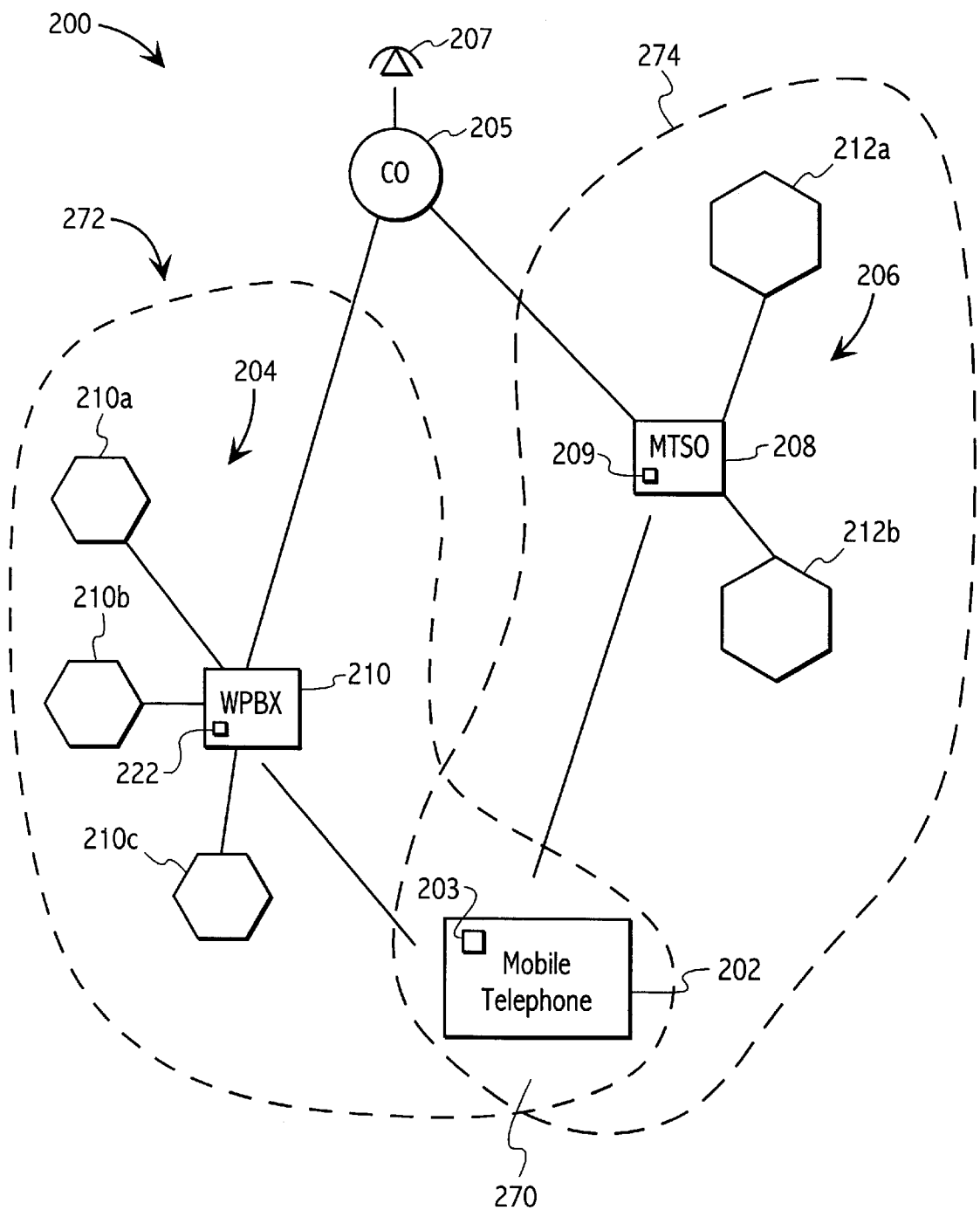
FIG. 2 is a block diagram of a wireless network system according to an embodiment of the present invention.

Turning now to FIG. 2, a diagram illustrating the interaction of a wireless communication device 202, a stationary telephone 207, and two wireless systems 204, 206 is illustrated. The system and method of the present invention can be used to facilitate the interaction of one or more wireless communication devices 202 and a plurality of wireless systems or networks. In FIGS. 1–7, an embodiment of the present invention is described with reference to private wireless network 204 and public wireless network 206. As used herein, "wireless communication device" refers to any wireless communication device or wireless telephone, including, for example, pagers, cellular telephones, PCS devices, and other wireless messaging, voice, and data communication devices.

The system 200 includes a private wireless network 204 and a public wireless network 206. The wireless networks 204 and 206 are exemplary of cellular communication device networks or PCS networks of various types. The private wireless network 204 includes a wireless private branch exchange 210 which provides central switching functions to a plurality of cells 210a, 210b and 210c. Each cell 210a, 210b and 210c includes an antenna for receiving signals from a wireless communication device and associated equipment, referred to as a base station (not shown), for transmitting the received signals to the wireless private branch exchange 210. The wireless private branch exchange 210, in turn, is coupled to a central office 205 representative of, for example, a central office for coupling calls to the public switched telephone network. The wireless private branch exchange 210 further includes a wireless switching control unit 222 configured to record use patterns and store a database relating thereto according to the present invention. The wireless switching control unit 222 includes a processing unit and a memory device to facilitate these functions, as will be described in greater detail below.

The public wireless network 206 includes one or more wireless communication device switching offices (MTSO), or PCS switching offices, which provide switching functions to a plurality of cells 212a and 212b. Each MTSO 208 includes a communications controller 209 for supervising communications within and external to the network. Again, each cell 212a, 212b includes a base station having an antenna for receiving signals from wireless communication devices and associated equipment for transmitting the signals to the MTSO 208. The MTSO 208 is coupled to central office 205 (which may be a different central office than the one to which the private wireless network 204 is coupled).

The wireless communication device 202 is configured for use in either the private wireless network 204 or the public wireless network 206. The wireless communication device 202 may thus be configured to receive, transmit and process signals according to various frequencies and/or coding standards and/or modulation formats of the varying public and private wireless networks. Exemplary protocols include time division multiple access (TDMA) and code division multiple access (CDMA) protocols. The wireless communication device 202 may also include a smart switching controller 203 configured to perform control operations relating to switching call connections on the wireless communication device 202 between the private wireless network 204 or the public wireless network 206, as will be discussed in greater detail below.

To make a call, the wireless communication device must be registered as a user in the respective network. This is accomplished, for instance, by the communication device and the wireless private branch exchange exchanging control signals. Once the registration occurs, a call from the wireless communication device 202 within private wireless network 204 is transmitted to an antenna (not shown) in a cell 210a, 210b, 210c and from the antenna to the wireless private branch exchange 210. A connection is then made from the wireless private branch exchange 210 to either another wireless private branch exchange or to the central office 205. From the central office 205, the connection is made to the public switched telephone network.

Similarly, prior to making a call on the public cellular network 206, an exchange of control signals is performed between the wireless communication device 202 and an MTSO 208 of the network. Once this occurs, calls via the public cellular network 206 are made from the wireless communication device 202 to an antenna (not shown), within the respective cell, which transmits the signal to the MTSO 208. The MTSO 208 in turn provides the connection to the central office 205 which connects to the public switched telephone network.

As will be discussed in greater detail below, the wireless switching control unit 222 is configured to supervise the switching of calls between the two networks based on time-location associations.

Figure 3:
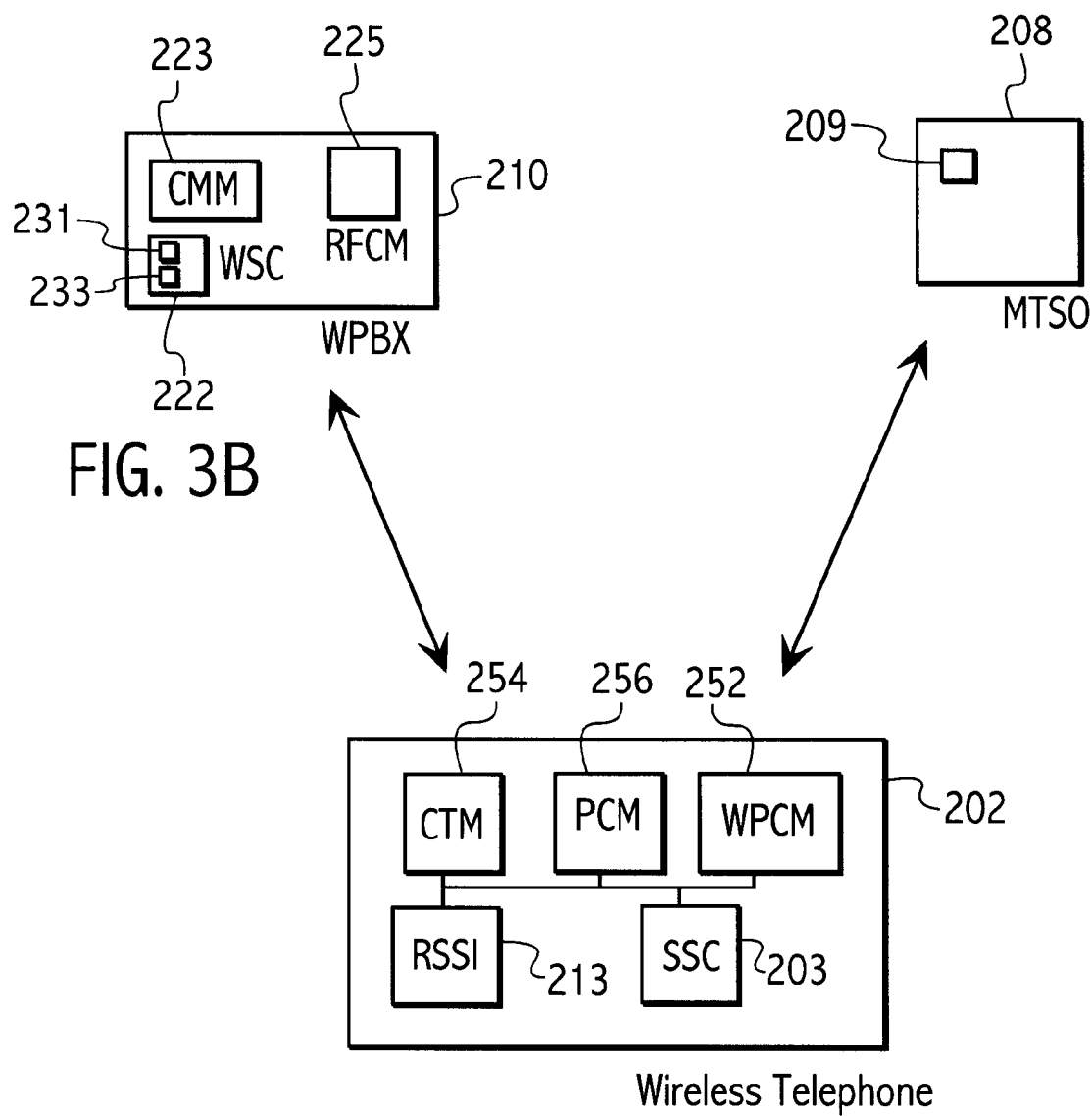
FIG. 3 is a more detailed block diagram of a wireless communication device and interface between two wireless networks according to an embodiment of the present invention.

Turning now to FIG. 3, a more detailed block diagram of the wireless systems illustrating various components of one embodiment of the present invention is shown. Components which are common to FIG. 2 retain the same reference numerals.

FIG. 3A illustrates a wireless communication device 202. The wireless communication device 202 may include a smart switching control unit (SSC) 203 configured to supervise (in conjunction with the relevant switching exchanges) transfers of active telephone calls from one network to another, based on time-location associations, as will be discussed in greater detail below. The smart switching control unit 203 may include a variety of circuits, including microprocessor or microcontrollers, or application specific integrated circuits (ASIC).

The wireless communication device 202 further includes a wireless private branch exchange communications module (WPCM) 252, a connection transfer module (CTM) 254, a PCS communications module (PCM) 256, and an RF signal strength indicator module 213 (RSSI). Each of the various modules may be comprised in microprocessor or microcontroller chips, or in application specific integrated circuits (ASICs). The WPCM 252 is used to supervise communications between the telephone 202 and the wireless private branch exchange 210. The PCM 256 is similarly used to supervise communications between the wireless communication device 202 and the MTSO or PCS switch 208. The CTM 254 supervises the switching of calls between cells within a particular network, and between the networks, as will be described in greater detail below. The RSSI 213 is used for recognizing the need to make a transfer of a call from, for example, the WPBX 210 because of signal fade, which occurs when the caller has gone past a boundary of the region serviced by the private wireless network 204.

Turning now to FIG. 3B, the wireless private branch exchange 210 is illustrated. The wireless private branch exchange 210 includes a call management module (CMM) 223, an RF communications module (RFCM) 225, and a wireless switching control unit (WSC) 222. The CMM 223 is used for managing the various telephony functions or services associated with the call, such as call transfer, conference call, and the like. The RFCM 225 includes an RF transceiver (not shown) and supervises the registration and call setup of the wireless communication device, as well as the hand-over or hand-off from one cell to another, and to other networks. The WSC 222 is used to supervise the inter-network switching management functions based on time-location associations according to the present invention. More particularly, the WSC 222 includes a processor or other control unit 231 and a memory 233 for storing a database of information which is used to predict a user's patterns of usage. In one embodiment, the database comprises a record of past usages monitored by the processor 231 of the WSC 222. In another embodiment, the database comprises a user-input calendar of future time-location associations. The processor 231 aboard the WSC 222 further monitors the location of the wireless communication device 202 when a call is made or received. The processor 231 accesses the database 233 and predicts a future location of the wireless communication device 202 to determine whether to switch from one network to another. It is noted that, while illustrated as a discrete unit, the WSC 222 can be comprised within RFCM, or as a unit external to the WPBX 210. Thus, FIG. 3 is exemplary only. In addition, it is noted that, while the system preferably operates according to software, hardware implementations are contemplated.

When the wireless communication device's RSSI 213 detects that signal strength has fallen below a predetermined threshold, the RSSI 213 communicates with the WPCM 252 to cause the WPCM 252 to attempt to make a handover to another antenna (i.e., within an adjacent cell) having a suitably strong signal. If the WPCM 252 cannot make a handover to an antenna within the private wireless network 204, it sends a signal to the CTM 254. In response, the CTM 254 transmits a signal to the PCM 256 to attempt to find another system to which it can transfer the connection.

The PCM 256 includes controls and apparatus for registering the wireless communication device as a valid user of the public wireless network 206. "Registration" refers to a method of verifying that the wireless communication device handset can communicate with a wireless network. This is accomplished with respect to public wireless network 206 by the wireless communication device 202 exchanging radio signals with the public wireless network 206 which are designed to establish status as a valid user. The exchange of radio signals takes place in accordance with protocols which are well known to those of skill in the art, for example, according to EIA/TIA interim standard "IS-54B Cellular System Dual Mode Mobile Station—Base Station Compatibility Standard." If the registration is successful, the PCM 256 sends a signal indicating that condition to the CTM 254. The CTM 254 in turn provides the connection (i.e., transfers the call between the networks).

According to the present invention, call transfers are made based on the time-location associations independent of the signal strength determination. Call transfers based on the time-location associations are similar to call transfers based on the signal strength determination. When the wireless communication device 202 enters within range of both networks, and a call is in progress, the processor 231 of the WSC 222 identifies whether the user will be repeatedly entering and existing the region serviced by, for example, the private wireless network. This identification occurs through the processor 231 of the WSC 222 accessing a database in the memory 233 in which user time-location associations are stored. In one embodiment, the time-location associations comprise a record based on the processor 231 monitoring the past usage of the wireless communication device 202. The locations can comprise, for example, the individual cells of the network. Time associations can be either based on duration within the cell and time-of-day associations, where applicable. In another embodiment, the database time-location associations comprise a calendar manually input by the user of his or her predicted schedule. In still another embodiment, the database comprises a combination of a user-input calendar and the monitored record.

Assume, for example, that a call is in progress on the public cellular network 206, and the user enters a region serviced by the private network 204. The WPBX 222 learns of the presence of the wireless communication device, for example, via a signal from the wireless communication device 202, i.e., from the exchange of control signals described above. If, after accessing the database in the memory 233, the processor 231 of the WSC 222 determines that the user will not, in fact, be repeatedly entering and exiting the region serviced by the private network, the WSC 222 signals the SSC 203 of the wireless communication device 202. The wireless communication device 202 allows the CTM 254 to effectuate a transfer from the public wireless network to the private wireless network. The PCM 256 informs the MTSO 208 of the public network 206 to release the call, and it is switched to the private network 204. It is noted that while supervision of this functionality on the wireless communication device end has been described with regard to the SSC 203, this functionality may be incorporated into the various other modules of the wireless communication device. It is similarly noted that while the RSSI 213 and the SSC 203 are illustrated as discrete units, in alternative embodiments, they may be integrated into a single unit.

If the processor 231 of the WSC 222 determines that the user will be repeatedly entering and exiting the region serviced by the private network, the WSC 222 either does nothing, or provides a control signal indicating that the wireless communication device is to continue being serviced by the public wireless network.

In another embodiment, the time-location associations comprise a record of cells and transit patterns relating to durations of time required to cross through the cells. The stored transit patterns may result from monitoring past usages, as described above, or a calendar input by the user, again, as described above. Thus, if a user has an active connection in the public network, and enters and remains within a cell of the private network for longer than a predetermined period, the system will switch to the private network. If the user stays within the cell for less than the predetermined period, however, the connection will remain with the public network.

For example, if the user has an active connection on the public network, his or her entry into a cell serviced by the private network will be detected, such as by the above-described registration process. The processor 231 accesses the database of time-location associations, which include a record of how long it takes to transit through the cell, If the user remains within the cell for longer than the determined period, the call connection will be transferred, as described above.

Figure 4:
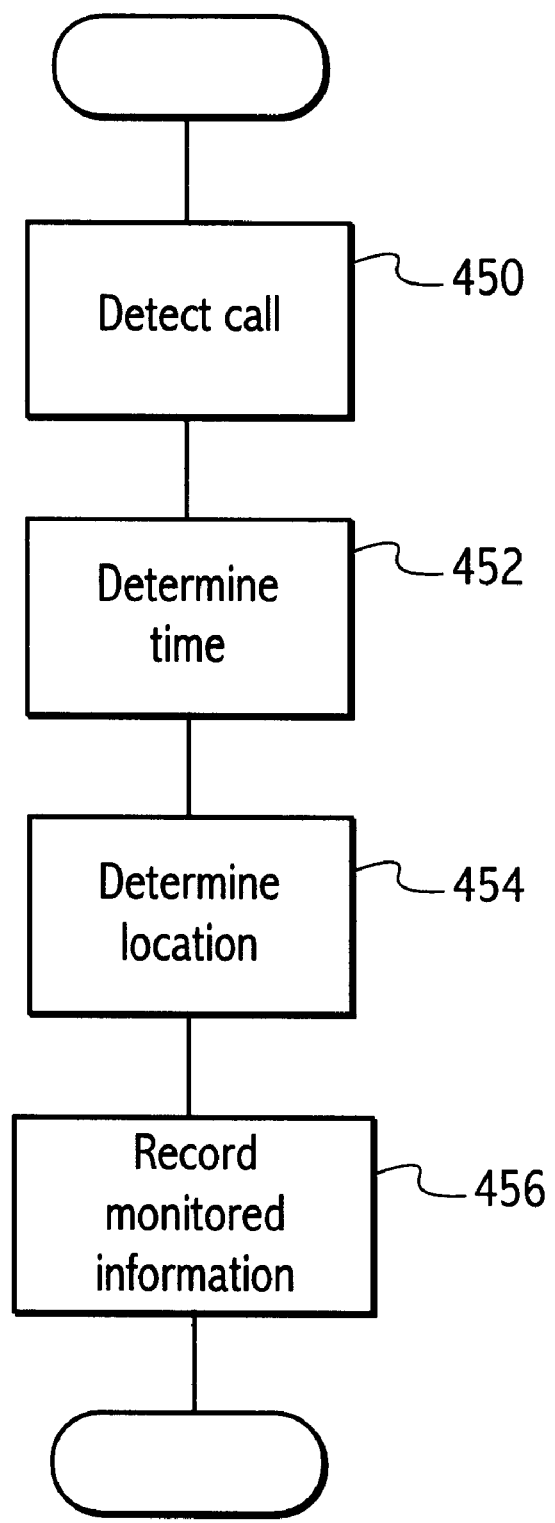
FIG. 4 is a flowchart illustrating monitoring of time and location usage patterns.

Turning now to FIG. 4, a flowchart illustrating the monitoring operation according to one embodiment of the invention is shown. Initially, a call involving the wireless communication device 202 is detected (step 450) and processed, for example, by the wireless private branch exchange 210. The call may be either a received call or one initiated by the wireless communication device 202. As discussed above, call processing includes the exchange of various control signals between the telephone's WPCM 252 and the wireless private branch exchange's CMM 223 and RFCM 225.

The processor 231 detects the servicing of the call and determines the time of the call (step 452). In addition, the processor 231 determines the location of the wireless communication device 202 (step 454) at the time of servicing the call. This may include, for example, the processor 231 monitoring present cell location and cell switching operations as controlled from the wireless private branch exchange. Alternatively, the SSC 203 may provide control time-location information directly to the wireless private branch exchange. The processor 231 then stores the times and locations in the memory 233, and later compiles it into a usable database (step 456). It is noted that, in one embodiment, the monitoring of the wireless communication device's (and hence user's) location, may be disabled. It is similarly noted that, in an alternate embodiment, constant monitoring of the wireless communication device's location (even when there is no active cal), for example, by the SSC 203 (or other functional modules of the wireless communication device) registering within each cell, or providing information within a global positioning system (GPS) is contemplated. Finally, the monitoring of the usage patterns may further comprise monitoring the duration of time the user spends within a cell.

Figure 5:
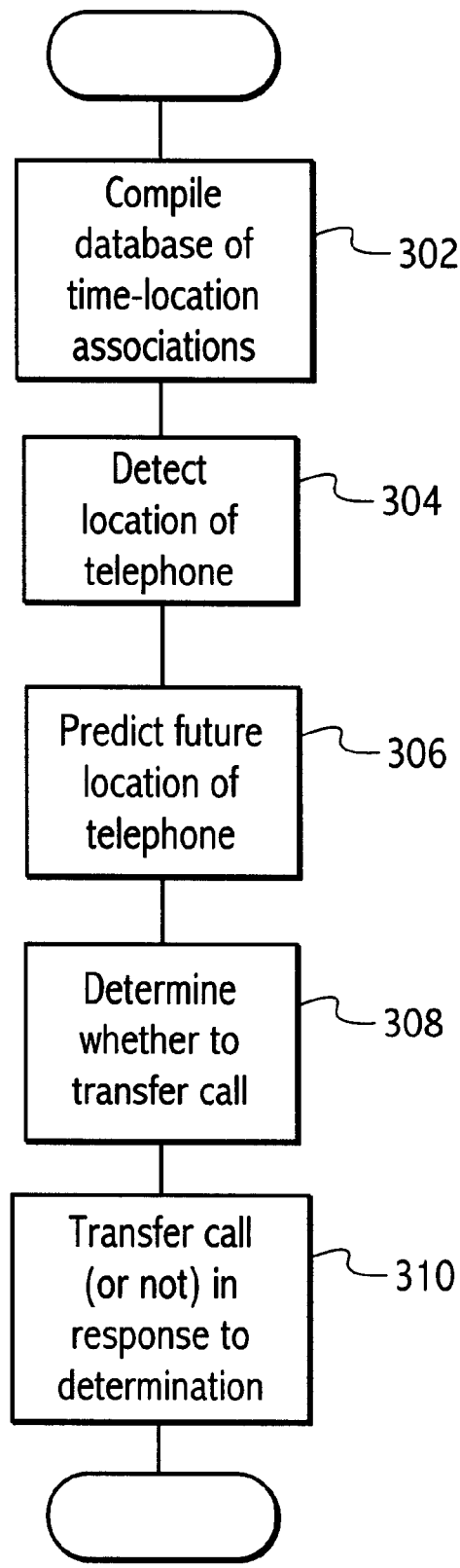
FIGS. 5, 6, 7A and 7B are flowcharts illustrating operation of various embodiments of the present invention.

Turning now to FIG. 5, a flowchart illustrating operation of an embodiment of the present invention is shown. Time-location associations of the wireless communication device are stored and compiled by the processor 231 as a database in the memory device 233 coupled to or within WSC 222 (step 302). For example, the location of the wireless communication device within the public network or the private network may be monitored by the processor 231 over time. The usage patterns of the wireless communication device (i.e., whether the wireless communication device is activated and registered as a user in a particular cell of one or the other of the networks) are monitored. Alternatively, and to provide a more accurate record of the user's actual schedule, so long as the wireless communication device is ON, the SSC 203 may be configured to provide a signal to the WSC 222 identifying the user's location within particular cells. The usage patterns may further comprise a record of the user's duration of time within a particular cell (i.e., how long it takes the user to transit through a cell).

Next, when the user initiates an active connection on the wireless communication device, the system detects the location of the device making the call (step 304). In addition to being used to manage the call, this information is used in order to determine whether the device's presence within a region serviced by the private network or the public network is transitory (i.e., whether the user will be repeatedly entering and re-entering one or the other of the networks). The processor 231 in the WSC 222 accesses its database and predicts what the user's usage is likely to be (step 306). As noted above, this may comprise determining how long it should take for the user to transit through the particular cell.

Based on the present time and user location, and the result of the accessed time-location associations from the database, the processor 231 determines whether to transfer the call (step 308). This may comprise, for example, the processor 231 waiting a predetermined period for the user to transit a cell. Finally, if the processor 231 determines that a transfer is necessary, the appropriate control signals are issued which effectuate the transfer from one network to another (step 310). For example, if the call is presently being serviced by the public network, and a determination is made to transfer the call, the WSC 222 sends a signal to the WPCM 252 (for example), which in turn, signals the CTM 254 to initiate a transfer from the public network 206.

It is noted that the system preferably continually updates the database. Thus, a user's usage patterns that are inconsistent with the previously stored and compiled database record are periodically incorporated into an updated database, to more optimally predict a future location.

Figure 6:
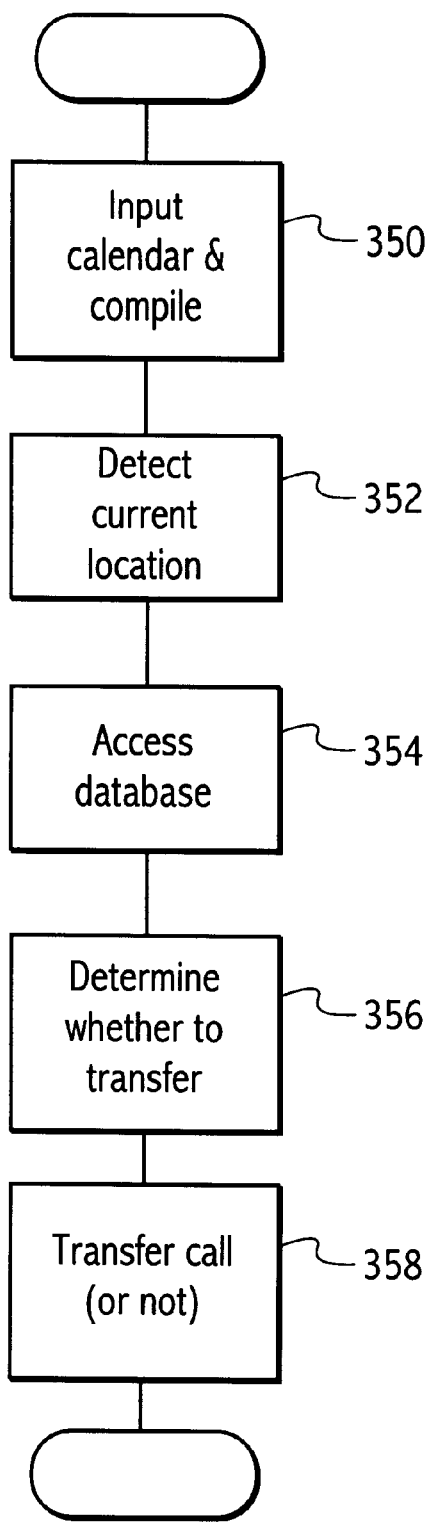

Turning now to FIG. 6, a flowchart illustrating operation of an alternate embodiment of the present invention is shown. In the illustrated embodiment, rather than monitoring past usage patterns, the system allows the user to input his schedule, according to time and location (step 350). This may further comprise the user entering estimates of his or her transit times through particular cells. Thus, the user determines what his schedule is likely to be during, for example, the coming week. He or she then records this information, for example, on a computer diskette, and uploads the information to the WPBX 210. Alternatively, provision may be made for the user to input this information directly from the wireless communication device 202. The WSC 222 stores the information within the memory 233 and compiles a database.

Once the database has been compiled, the system is ready for use. Next, when the user initiates an active connection on the wireless communication device, the system (preferably processor 231) detects the location of the device making the call (step 352). In addition to being used to manage the call, this information is used in order to determine whether the device's presence within a region serviced by the private network or the public network is transitory (i.e., whether the user will be repeatedly entering and re-entering a region serviced by one or the other of the networks). The processor 231 of the WSC 222 accesses its memory 233 for the database (step 354) and determines whether to transfer the call, by predicting what the user's future usage pattern is likely to be (step 356). This may include waiting a predetermined period for the user to exit the cell. Finally, depending upon the outcome if the determination in step 356, the call is transferred (step 356).

For example, if the call is presently being serviced by the public network, and a determination is made to transfer the call, the WSC 222 sends a signal to the WPCM 252 (for example), which in turn, signals the CTM 254 to initiate a transfer from the public network 206. It is noted that the calendar operation described with regard to this embodiment may also be incorporated into the embodiment described above with respect to FIG. 5. Thus, for example, both the user's schedule and his actual access patterns may be used to determine whether a call should be transferred from one network to the other.

Figure 7A:
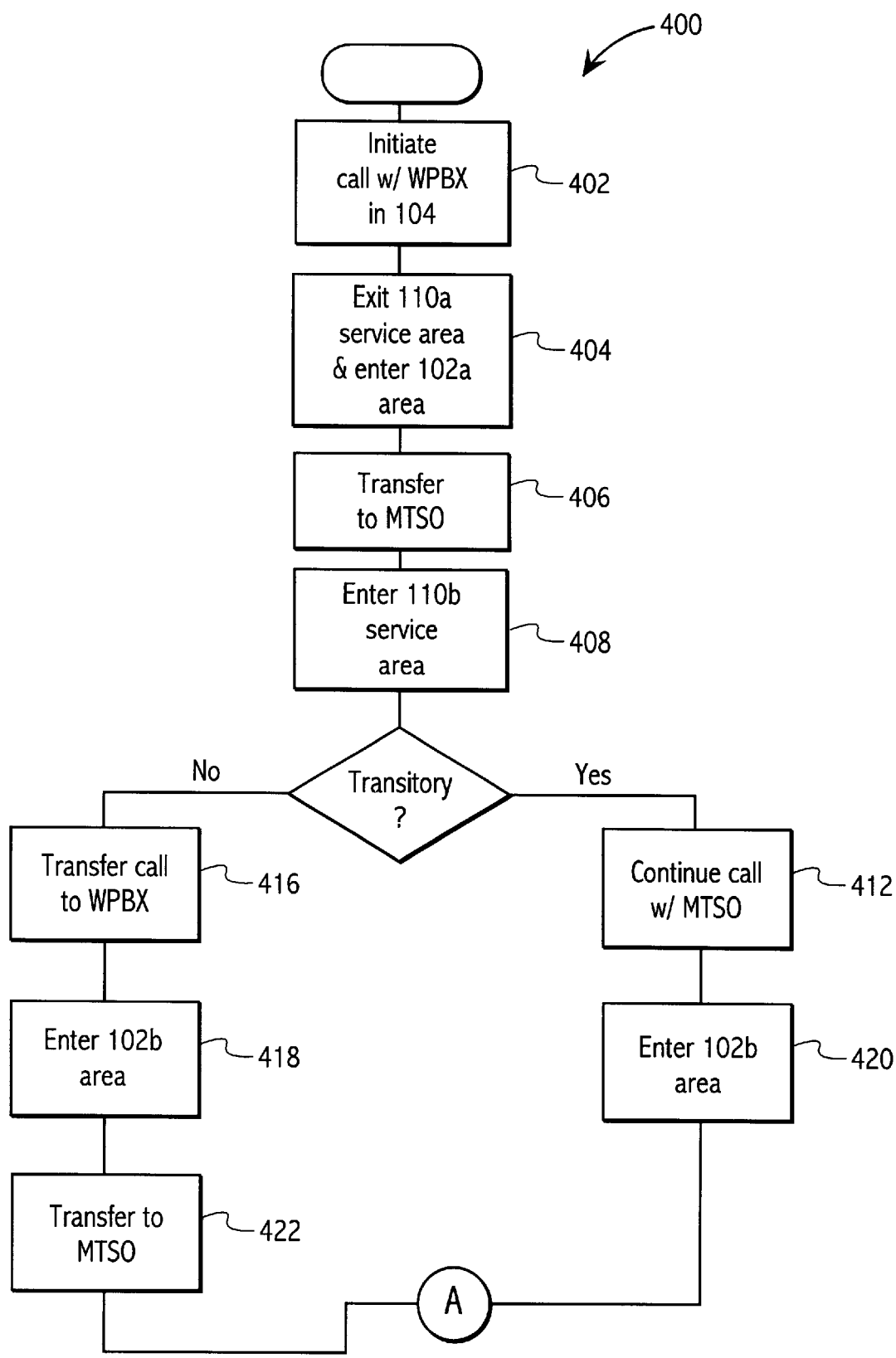
Figure 7B:
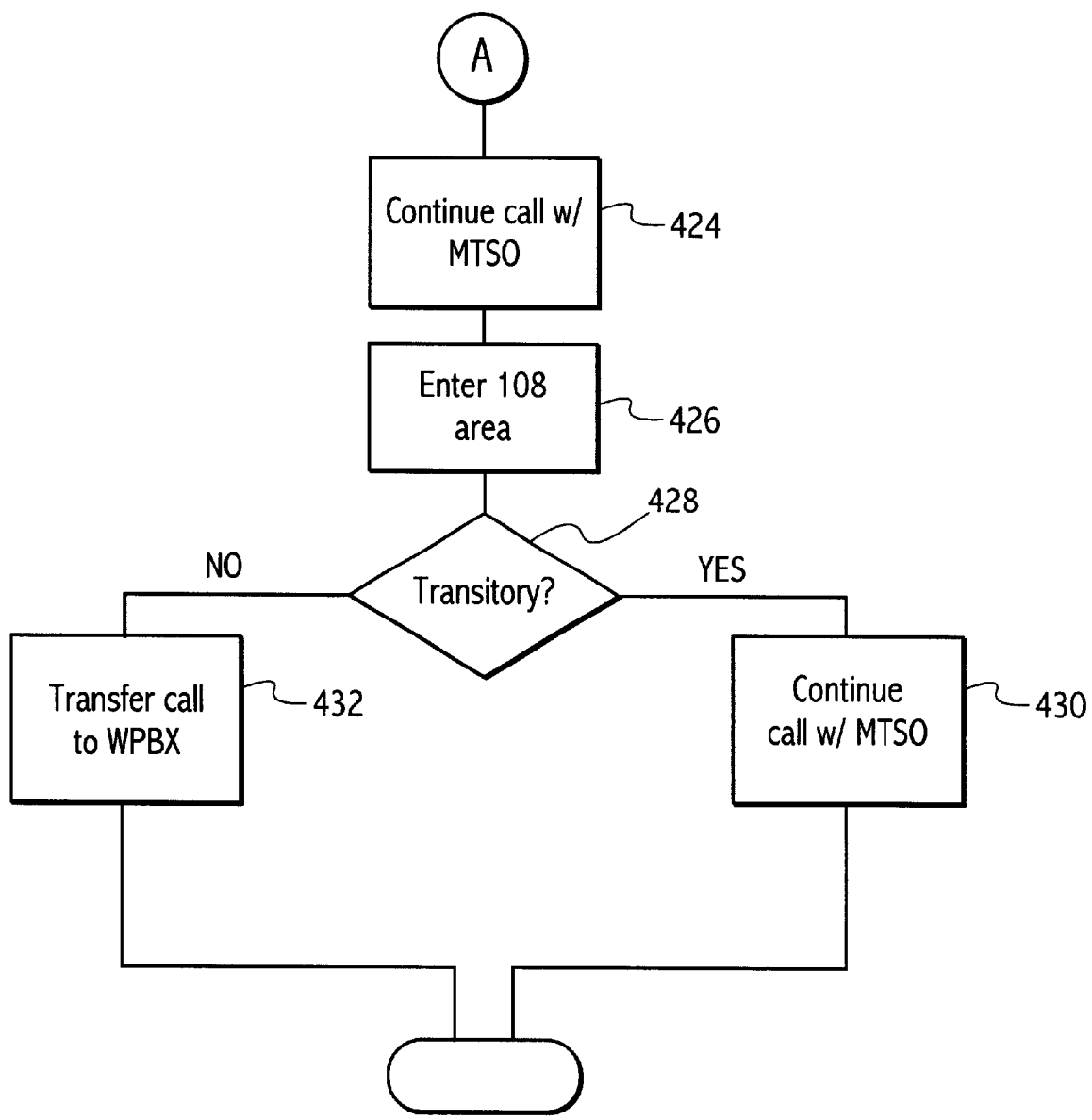

Turning now to FIG. 7, a flowchart 400 illustrating an exemplary operation of the present invention is shown. The flowchart 400 illustrates the call processing procedure for a user travelling as illustrated in FIG. 1. For example, the user initiates a call within building 104 serviced by cell 110a of the private wireless network 204. The call is routed to the wireless private branch exchange 210 connected to a central office 205 of the public switched telephone network (step 402). As illustrated by the dashed line, the user exits building 104 and leaves the area 110a serviced by the private wireless network 204 (step 404). The RSSI 213 detects a signal fade and requests a transfer to the public wireless network 206. The connection to the public network is executed as described above (step 406). The user continues on and enters the cell 110b (near building 106), which is serviced by both the public network 206 and the private network 204. Upon the user's entry into the area 110b, the system determines whether or not the user's presence within the area 110b is relatively permanent (i.e., whether the user is likely to be remaining within the building for longer than a predetermined period) (step 410). As described above, this determination is based on the WSC 222 accessing its database and providing appropriate control signals responsive thereto.

If the user's presence is only transitory, the system will continue the call via the MTSO of the public network (step 412). If the user's presence within the area 110b is determined to be relatively permanent, however, the call will be transferred to the private network to be serviced through the wireless private branch exchange 210 (step 416). If the user then leaves building 106 and enters the area serviced by the cell 102b of the public network (step 418), the call will be transferred to the MTSO 208 of the public network (step 422).

If, in step 412, the user continues into the cell 102b, serviced by the public wireless network (step 420), the call continues to be serviced by the public network (step 424). The user in either case continues on into the area 110c, serviced by the private wireless network (step 426). Again, a determination is made whether or not the user's presence is relatively permanent or transitory (step 428). If the user's presence is determined to be only transitory (i.e., less than a predetermined period), then the call continues to be processed by the public wireless network (step 430). If, however, the user's presence is determined to be relatively permanent, then the call is processed by the private network (step 432).

As discussed above, broadly speaking, one aspect of the present invention relates to using a user's calendar to determine the routing of telephone calls. Such a technique is also applicable in the context of telephony applications within local area networks.

Figure 8:
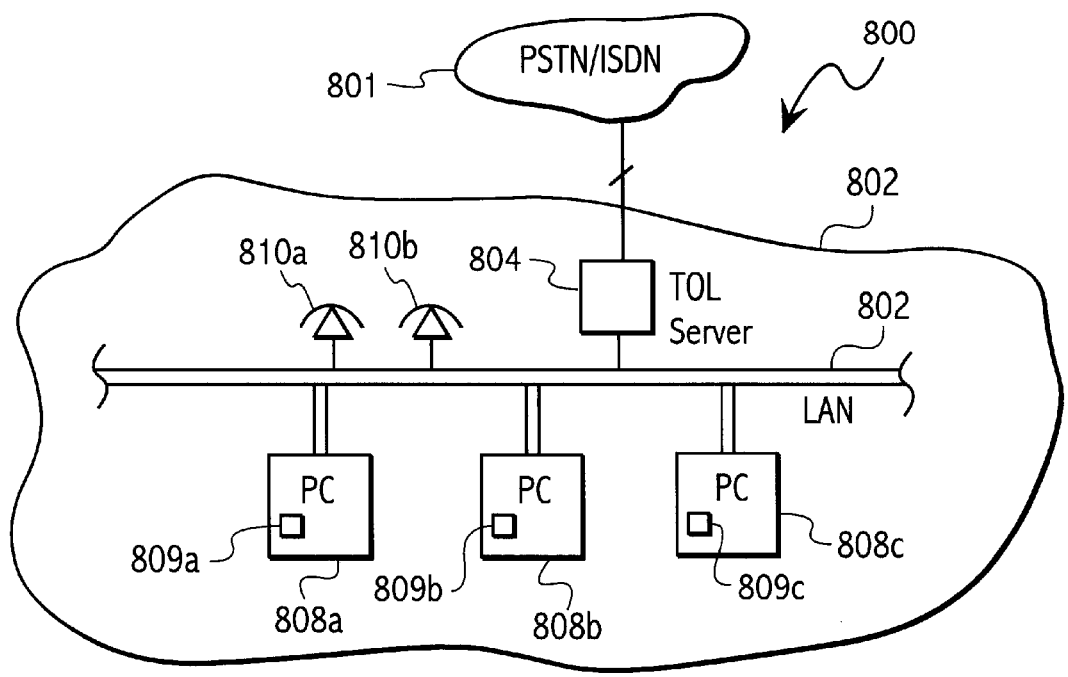
FIG. 8 is a diagram illustrating a telecommunications system according to the present invention.

Turning now to FIG. 8, a block diagram illustrating a local area network employing a telephony over LAN (TOL) server 804 is shown. The TOL server may be a Hinet RC 3000, available from Siemens Corporation, or other TOL server, such as an NBX 100 Communication System available from NBX Corp., Andover, Mass. The local area network 800 includes network cabling 802 to which are coupled a TOL server 804, a variety of personal computers 808a–808c, as well as a variety of telephones 810a–810b. The computers 808a–808c may include telephony and calendar software 809a–809c, respectively, according to the present invention. As illustrated, the telephony over LAN server 804 further functions as the LAN server. The TOL server 804 is coupled to the PSTN/ISDN network 801 from which external telephone calls may be received. The LAN 802 may be any of a variety of known local area networks running a variety of local area network operating systems including, for example, Windows NT available from Microsoft Corporation of Redmond, Washington and the Novell Corporation's Local Area Network Operating System. Furthermore, the local area network 802 is configured to communicate with work stations such as the telephones and personal computers via known protocols such as CSMA/CD protocol.

Figure 9:
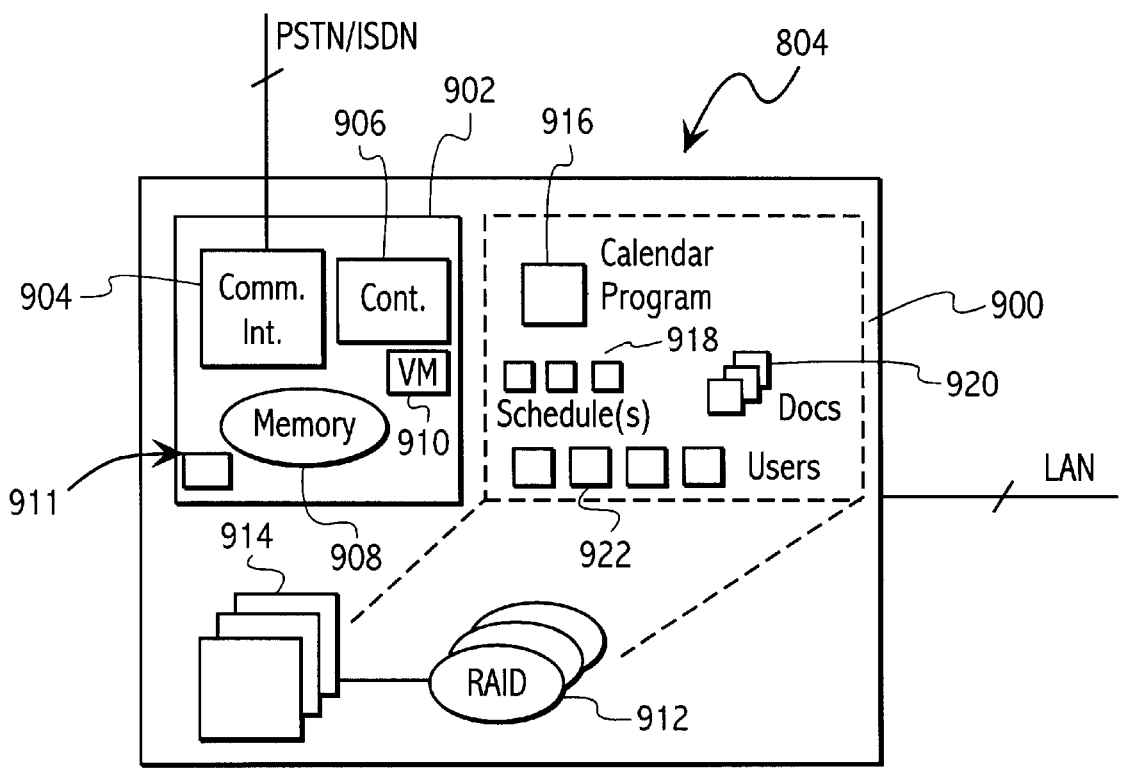
FIG. 9 is a block diagram of a telecommunications server according to an embodiment of the invention.

A block diagram of the exemplary TOL server 804 is shown in greater detail in FIG. 9. It is noted that, while described in the context of an integrated LAN and TOL server, the present invention is equally applicable to a local area network employing independent LAN and telephony servers, as well as a local area network employing a LAN server and coupled to a private branch exchange (PBX). Thus, FIG. 8 and FIG. 9 are exemplary only. As shown, the TOL server 804 includes a telephony interface unit 902 coupled to one or more processors 914, which in turn are coupled to one or more memory units 912. It is noted that the telephony interface unit 902 may be embodied as a separate "gateway" unit. The TOL server 804 further includes known components such as a LAN interface (not shown) configured to apply the CSMA/CD protocols, for example. The processors 914 may include one or more Pentium, Pentium II or Pentium Pro-Type processors. The processors 914 may be configured to supervise both LAN and telephony functions of the TOL server 804. The memories 912 may include one or more disk drives, such as one or more RAID systems (Redundant Arrays of Independent Disks).

The processing units 914 may be configured to run a variety of software 900, which may be stored in the memory units 912. In particular, the software 900 may include a server calendar interface program 916 configured to store and/or interface with a plurality of schedules 918, a variety of different documents 920, and to maintain communication with a variety of users 922. In particular, the server calendar interface program 916 may include the Microsoft Exchange Server with Schedule Plus and Back Office products, or other calendar or scheduling program. As will be explained in greater detail below, calendars associated with the users may be used by the TOL server 804 to route incoming telephone calls.

The telephony interface 902 further includes a communication interface 904 for interfacing with the PSTN/ISDN 801 (FIG. 8). The communications interface 904 thus may include one or more include subscriber line interface cards and encoding/decoding circuits (not shown), as are well known in the art. The telephony interface 902 may further include a known voice messaging unit 910 and a known caller identification unit 911, as will be explained in greater detail below. The TOL server 804 may further be configured to run e-mail programs.

Finally, as will be discussed in greater detail below, the TOL server 804 may be configured to function as a server for a company's Intranet, and couple the company's Intranet, with appropriate firewall provisions, to the Internet.

The TOL server 804 uses the caller identification information received by the caller-ID unit 911, in conjunction with the server calendar interface program 916, to supervise routing of received telephone calls, as will be explained in greater detail below. In particular, as discussed above, the user of a PC 808a may travel to a location of another workstation such as a PC 808b, 808c or a telephone 810a, 810b. The user of the PC 808a may program his schedule into a calendar application program 803 running on his PC, which is accessible to the server calendar interface program 916 of the TOL server 804, as will be explained in greater detail below. Alternatively, the user may manually input, such as via a World Wide Web browser, call forwarding information, which is then accessible to the TOL server 804.

Figure 10:
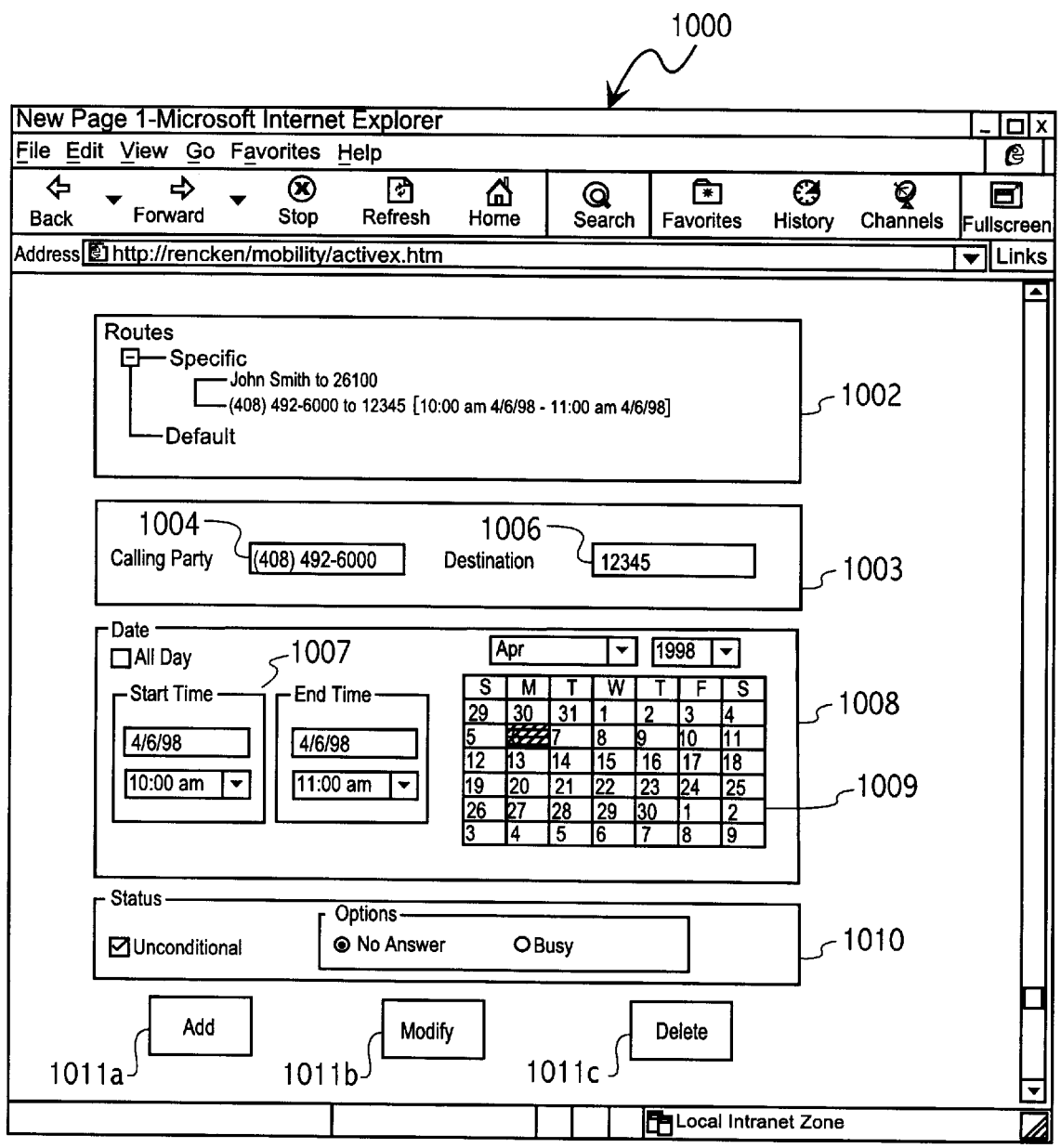
FIG. 10 is a diagram of an exemplary user interface according to an embodiment of the invention.

Turning now to FIG. 10, a diagram of an exemplary user interface 1000 for a user to input call forwarding information according to the present invention is shown. The user may direct call forwarding to occur based on caller-ID information, particular times, or a preset calendar. In particular, as shown, the system is configured to run via a Web browser such as Microsoft Internet Explorer and is accessible, for example, via a company's intranet. As shown, the GUI 1000 includes a routing display window 1002, and a route setting window 1003 which includes a calling party window 1004 and a destination window 1006. In addition, a calendar window 1008 is provided which includes a calendar 1009 for setting dates, and time windows 1007 for setting beginning and ending times. Finally, a status window 1010 for setting options is provided. As will be described in greater detail below, the user may enter into the calendar window 1008 his duration of routing and may enter into the route setting window 1003 the specific identity of a calling party to be routed to the particular destination entered in the window 1006.

Figure 11:
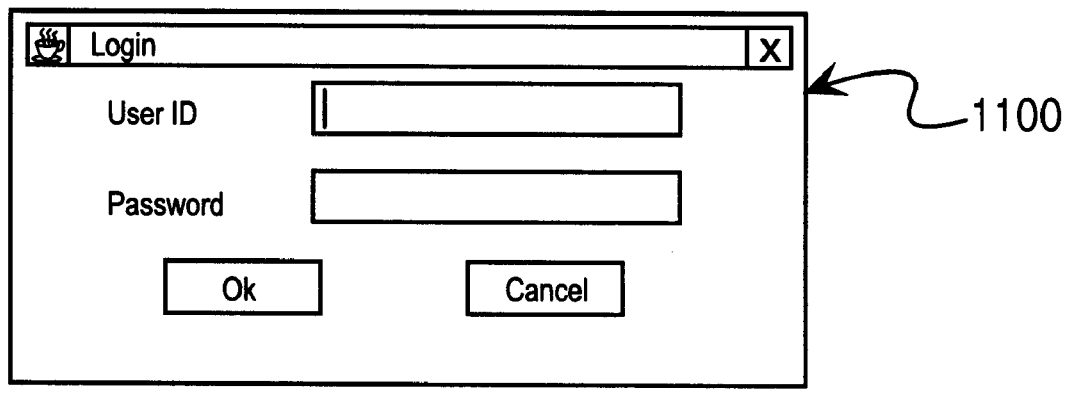

For example, the user may access the Internet web page and scheduling software via the client log-in dialog illustrated in FIG. 11. Thus, the user types in a user name and a password to access the scheduling system 1000.

Thus, the user can modify call forwarding information based on caller identification, time and calendar information via a Web browser. In response to the user making the above-described inputs into the GUI 1000, the TOL server 804 and, in particular, the server calendar interface program 916 updates a user's schedule 918. The schedules 918 are updated such that when telephone calls are received via the PSTN/ISDN, the interface 902 routes the incoming call accordingly. For example, if an incoming call is received, the communication interface 904, via the controller 906, checks caller-ID information using the caller-ID unit 911. The controller 906 then accesses the server calendar interface program 916 to determine whether or not routing is necessary based on the user profile. If it is, then the call is routed to the desired destination.

Figure 12A:
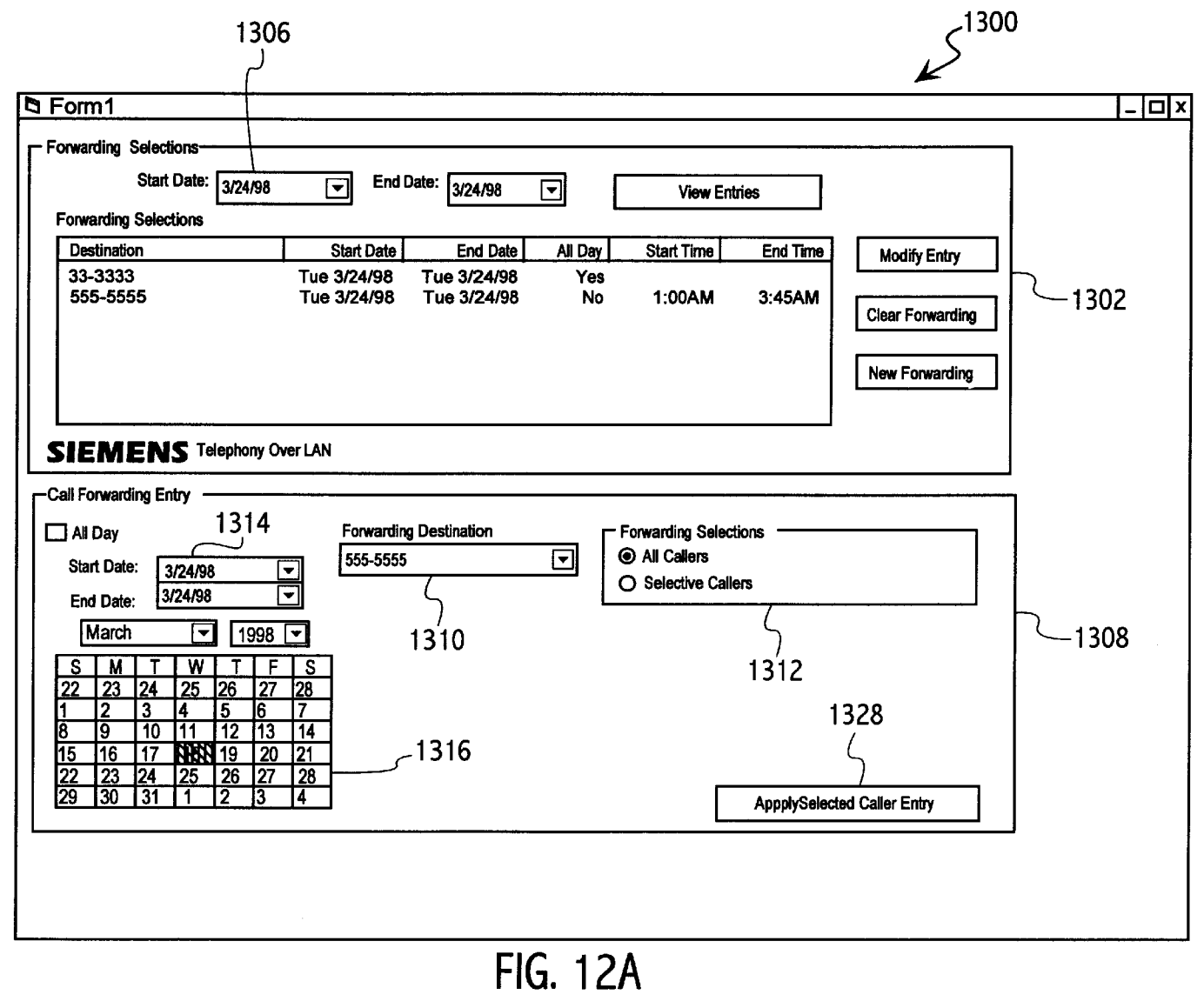
Figure 12B:
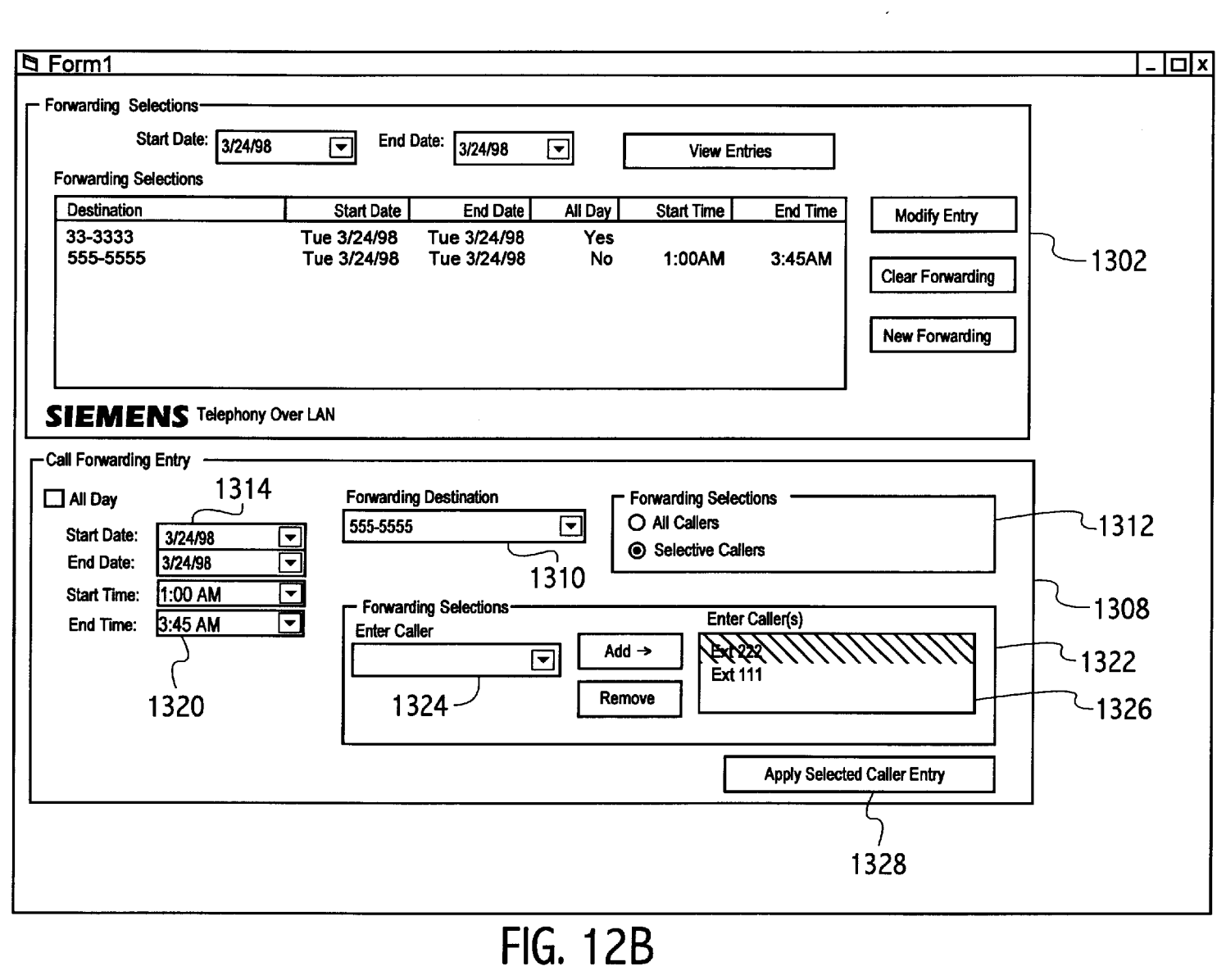

Turning now to FIGS. 12A–12B, exemplary graphical user interfaces 1300 for setting call forwarding information via the Web browser of FIG. 10 are shown. In particular, in FIG. 12A, the user may be presented with a forwarding window 1302. The user may access this, for example, by clicking one of the icons 1011a–1011c (FIG. 10). The forwarding window 1302 includes a forwarding status window 1304 and a date selection window 1306. In addition, the call forwarding entry window 1308 displays the call forwarding information for the individual forwarded selections shown in the forwarding selection display window 1304. In particular, the user may select start and end dates, either by keying in numbers through the windows 1314 or by selecting the calendar dates 1316. The user may further select that all calls will be forwarded or only selected calls will be forwarded using the forwarding selection window 1312. Further, the user may select particular times or all day for the call forwarding. As illustrated in FIG. 12A, the user has selected "all day" for the call forwarding date selection. Thus, all calls received Mar. 28, 1998 are to be forwarded to "555-5555," as set in the forwarding destination window 1310.

In contrast, FIG. 12B illustrates the result of clicking the "Selected Callers" button of the forwarding selection window 1312, as well as the time/date selection. The user is provided with a selecting callers window 1322, which allows the user to either individually enter a number which is to be forwarded via window 1324, or may select from an address book such as shown in window 1326. In the case of both FIGS. 12A and 12B, the changes are entered by selecting the APPLY SELECTED CALLER key 1328.

As shown in FIGS. 12A and 12B, the user's calendar is provided and accessible via the Internet. According to an alternate embodiment, however, the user applies his mobility calendar via a local or LAN based calendar program such as Microsoft Access. The TOL server 804 accesses the program for call forwarding, as will be described below.

Figure 13A:
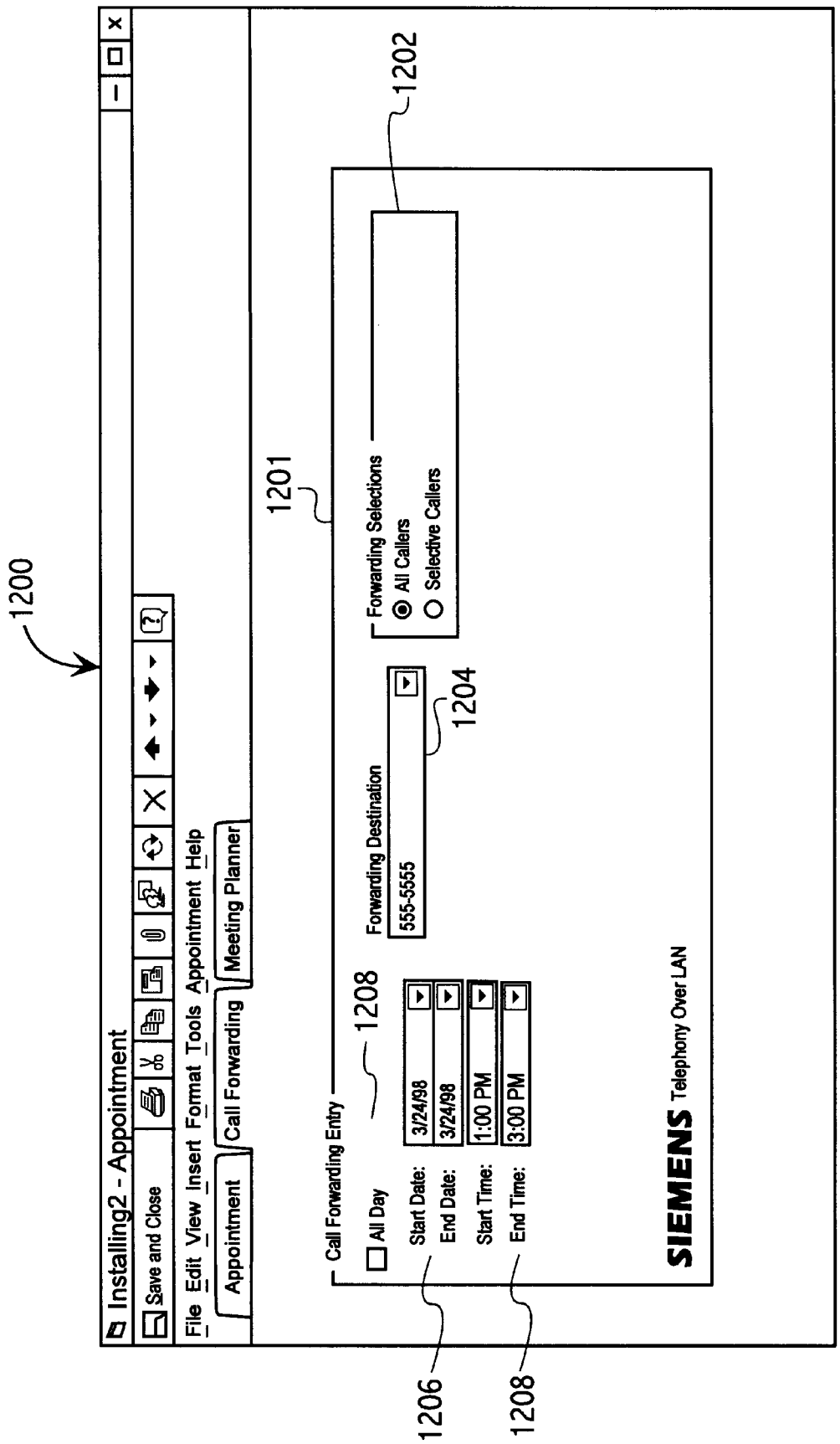
Figure 13B:
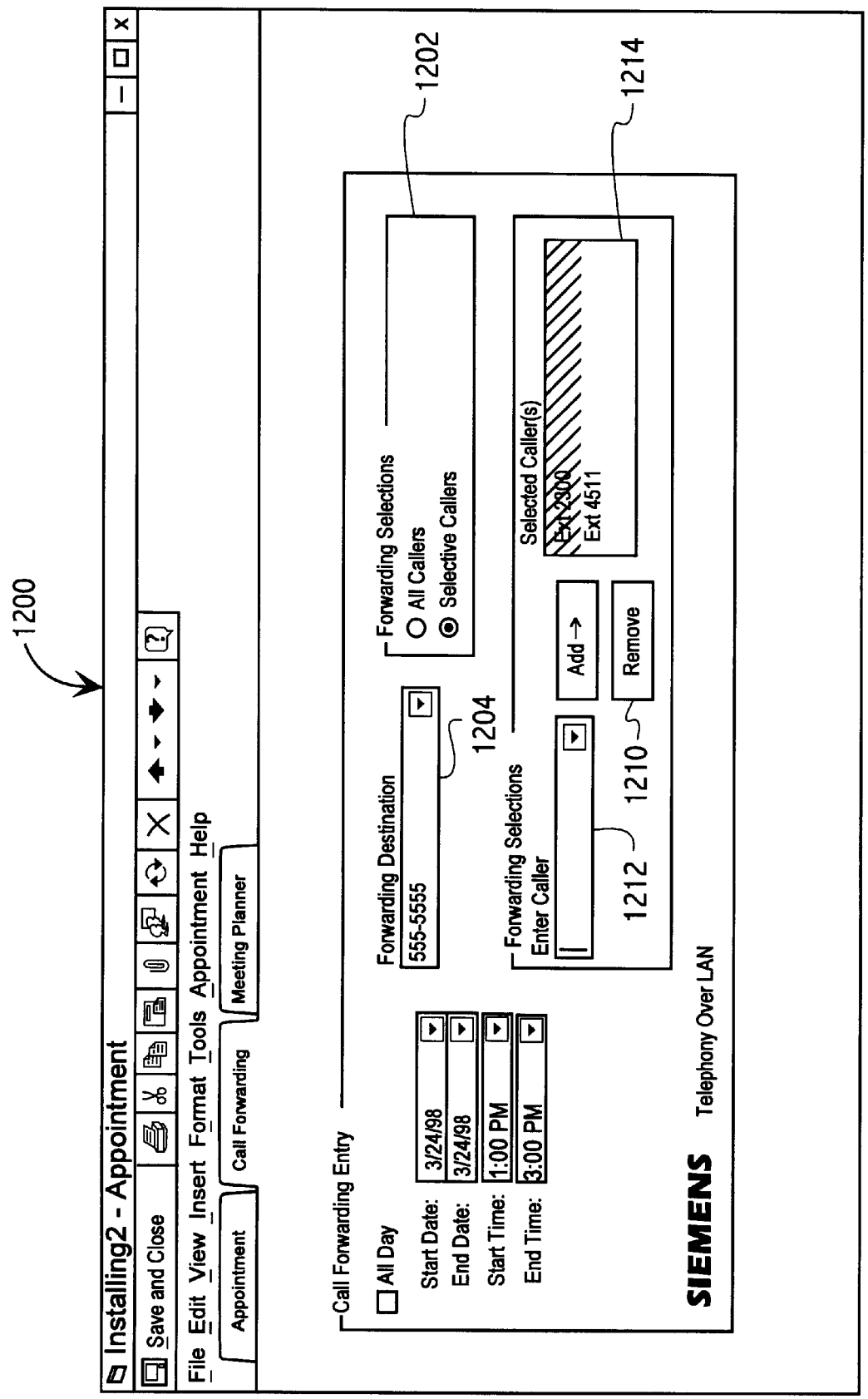

In particular, turning now to FIGS. 13A–13B, exemplary appointment windows are illustrated. As above, the user can set call forwarding entries, including start and end dates, start and end times, forwarding destinations, as well as defaults such as "all day" and "all callers". If the user selects individual callers, then the user can also set individual forwarding destinations.

In particular, turning now to FIG. 13A, an exemplary interface 1200 for selecting call forwarding information through an appointment calendar program is shown. By selecting Call Forwarding, the user is presented with a call forwarding entry window 1201. The user is provided with forwarding selections options 1202, which allow the user to select all callers or selective callers, identify forwarding destinations via a window 1204, and identify start date and end dates via windows 1206, and start time and end times via the windows 1208. Alternatively, the user may select ALL DAY via the ALL DAY select key 1203. It is noted that the call forwarding entry 1201 provides the user with automatic start date, end date, start times and end times based on appointments the user set through the appointment window. Once the user has entered has selections, his calendar or schedule 918 (FIG. 9) is updated. FIG. 13B illustrates the user settings when the user sets the selecting callers button in the window 1202. In particular, the selecting callers window 1210 allows the user to enter the extension or phone number of the caller in the window 1212 and add and remove the users from a list in the window 1214. The window 1214 may, for example, provide a list or address book of all of the extensions on the telephone network.

Turning now to FIG. 14, a flowchart illustrating an exemplary method for invoking the mobility feature from a Web browser, such as illustrated in FIGS. 10, 11 and 12A–12B, is shown. In particular, in a step 5002, the user invokes the Web browser. Though a Microsoft Explorer browser is shown, any browser is suitable. In a step 5004, the user navigates to the TOL mobility site (FIG. 10). Of course, the TOL mobility site may be set as the default. In a step 5006, the user attempts log-in using the client log-in dialog box 1100 (FIG. 11). If the log-in is not successful, in a step 5008, the event is logged and the user disconnected. If, however, authentication in step 5006 was successful, then in a step 5010, the user may modify the mobility user profile. As discussed above, this may be based on caller ID, time or calendar. For example, the user may be presented with the GUI 1000 (FIG. 10). The user will be shown the call forwarding routes from the window 1002 and other call forwarding information, such as calling party and destination in window 1003, and start, and time, and dates via the window 1008. The user may edit the call forwarding information by selecting one of the buttons 1011a–1011c. Thus, the user may add new call forwarding information, modify existing call forwarding information, or delete call forwarding information. If the user decides to add or modify the call forwarding information, the user may be presented with the windows 1300 of FIGS. 12A and 12B. As described above, the user may then select the appropriate forwarding information. In a step 5012, the user saves the updated forwarding request. In a step 5016, the system tries to determine whether the data are consistent; for example, the begin time should be before the end time. If the data are not consistent, then in a step 5018 the user is given an error message and in a step 5014, is given the opportunity to rectify the error. Finally, in a step 5020, the user can save the data to the database.

Figures 16, 17:
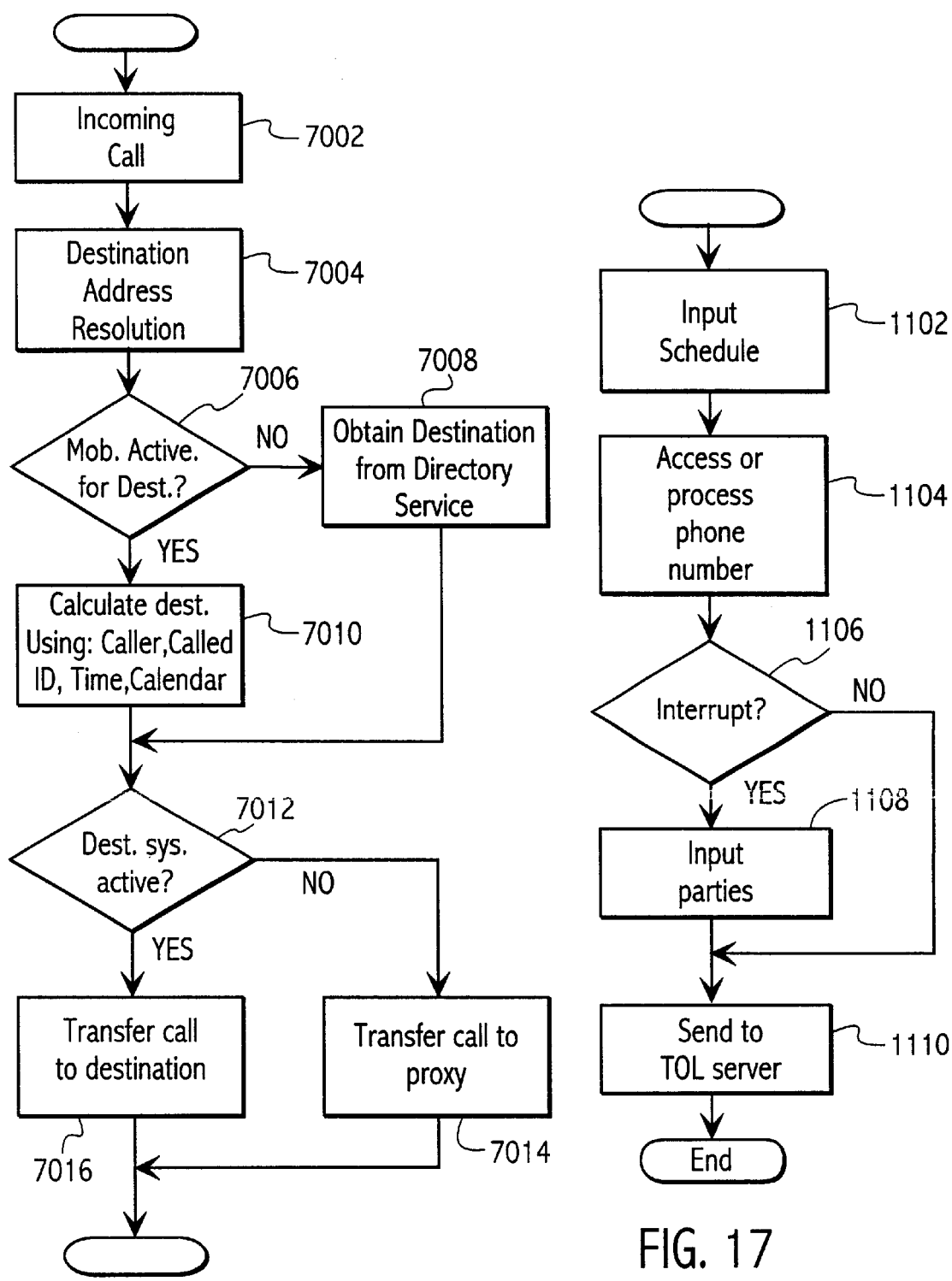

Turning to FIG. 15, a flowchart 6000 illustrating one method for invoking the mobility feature from a calendar application, is shown. In this method, the calendar program is used to access the server-based program described above. In particular, in a step 6002, the user may invoke the calendar application. In a step 6004, the user keys in the meeting in a known manner, and the system determines whether or not the meeting will affect the user's virtual location. If not, then no further action is taken. However, if the meeting will affect the virtual location, then in a step 6006, the system may provide the user with an icon to invoke the Web browser and access the mobility user profile. In a step 6008, the user may select the meeting forwarding button and begins the process described in FIG. 14. Turning now to FIG. 16, a flowchart 7000 illustrating use of the mobility database to define the virtual location of the user is shown. In particular, in a step 7002, the system receives an incoming call at the communications interface 902. In a step 7004, the system determines the destination address of the call, in a known manner. In a step 7006, the system determines whether or not mobility has been activated for the specific destination. For example, the controller 906 may access the user profiles 922 and/or schedules 918. If mobility has not been activated, then in a step 7008, the destination is obtained from the standard directory service. The destination system is determined to be active or inactive and the call transferred either to proxy, such as a secretarial location, or to the destination in step 7014, 7016. If, however, in step 7006 the mobility had been activated for the specific destination, then in a step 7010, the system determines the destination based on the calendar information, the caller-ID, the called ID and the time of day. The system then determines whether the destination system, as determined in step 7010, is active. If the destination system is inactive, then in a step 7014 the call is transferred to proxy, for example, a secretarial location. If, however, in step 7012 the destination system was active, then in a step 7016 the call is transferred to the designated destination.

As discussed above, the routing information may be supplied directly within the calendar program. A flowchart illustrating operation of the inputting process, according to an embodiment of the present invention is shown in FIG. 17. In particular, in step 1102, the user may input the user's schedule, for example, using the interface shown in FIGS. 13A–B. In a step 1104, the scheduling software may access or display the phone number of the remote location to which the user may be moving, or alternatively, the user may input the telephone number or extension of the location, for example, via the window 1204. In a step 1106, the user sets whether or not the user may be interrupted at the remote location. Thus, for example, the user may set, as in window 1202, whether or not calls may be transferred. In a step 1108, the user may further input the identifies of parties to which or for which he may be interrupted, using, for example, the interface of FIG. 13B. As will be explained in greater detail below, caller-ID information may be used to filter or screen calls before transfers are permitted. Finally, in a step 1110, the calendar information with the call information may be uploaded to the TOL server 804 for access by the calendar interface program 916. Alternatively, the calendar and/or schedule may reside on the local user's PC or access by the TOL server 804 upon reception of telephone calls, as will be explained in greater detail below.

Figure 18:
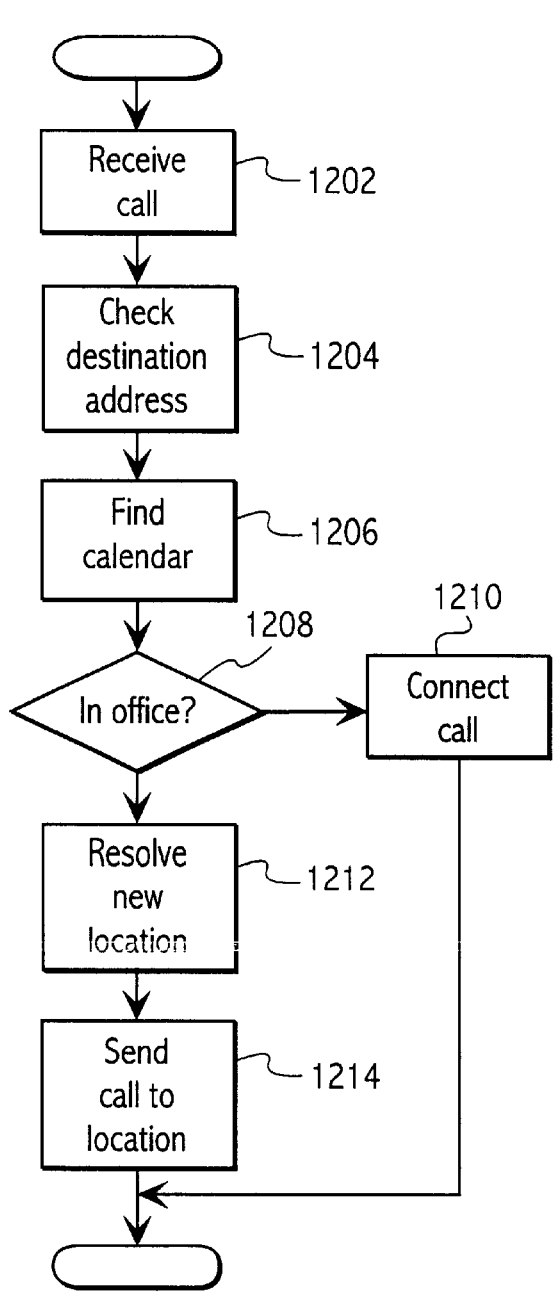

Turning now to FIG. 18, a flowchart 1200 illustrating a method according to another embodiment of the present invention is shown. The method in FIG. 18 illustrates the general call transfer process. In particular, in a step 1202, the TOL server 804 may receive a telephone call from the PSTN/ISDN 801. As is known, this includes the TOL server 804 detecting the destination phone number. Thus, in a step 1204, the TOL server 804 checks the destination number, for example, by the interface 902 reading the provided information. In a step 1206, the TOL server 804 uses the destination number to determine the identity of the user to which the call is directed and accesses the user's calendar. For example, this may include the server calendar interface program 916 receiving the user's identify and accessing a memory location identified thereby. In a step 1208, the calendar interface program 916 determines whether or not the user is in the office or located at the location of the PC. If the user is in his office, then the call is connected in a step 1210. However, if the user is not in the office, then the location at which the user is present is determined in a step 1212. For example, the server calendar interface program 916 identifies the extension of the new location and provides it to the interface 902. In a step 1214, the call is directed to the user's new location, as provided by the calendar interface program 916.

Figure 19:
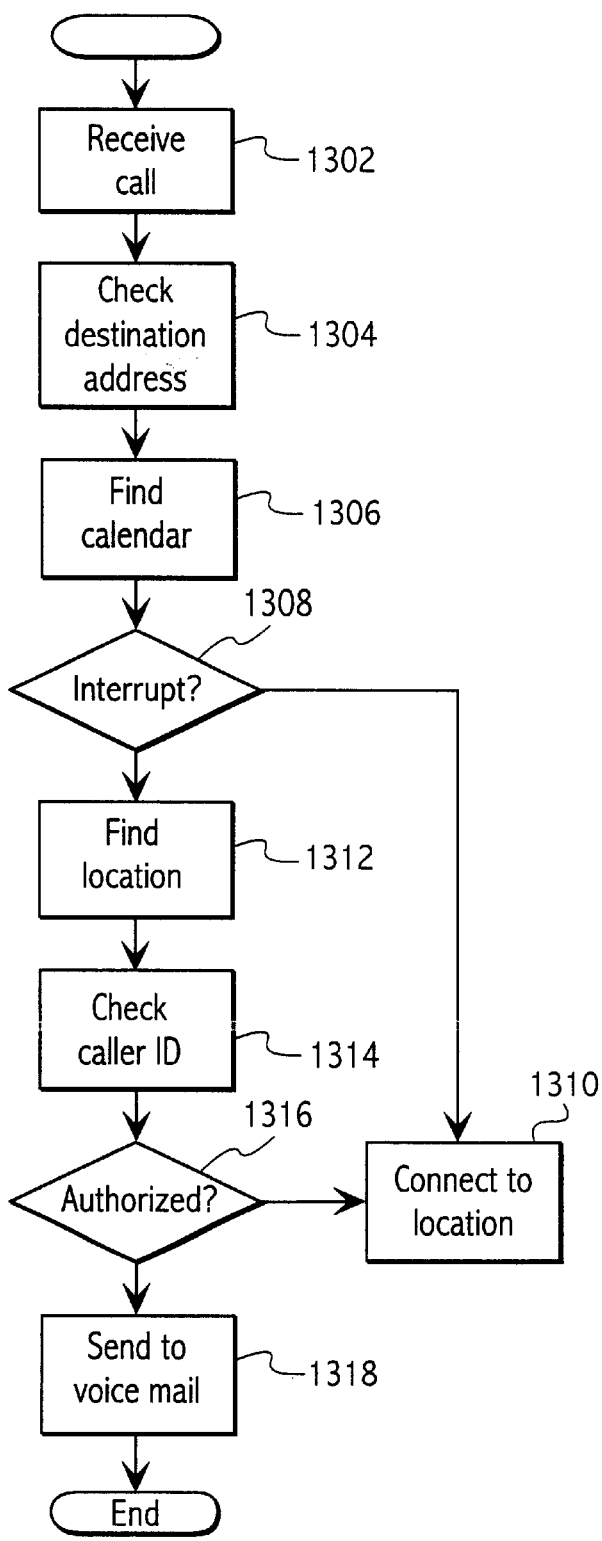

Turning now to FIG. 19, a flowchart illustrating operation of another alternate embodiment of the invention is shown. In particular, in a step 1302, the system receives a telephone call. In a step 1304, the destination number is checked by the TOL server 804. In a step 1306, the TOL server 804 uses the destination number to identify and access the user's calendar. In a step 1308, the calendar is read to determine whether or not the user is in the office. If so, the call is connected, in a step 1310. However, if the user is not in the office, then the user's new location is determined in a step 1312. In a step 1314, the TOL server 804 accesses caller-ID information, if any, from the caller-ID unit 911 to determine the identify of the caller. In a step 1316, the TOL server 804 checks the caller-ID information against input information to determine whether or not the caller has authorization to interrupt the user at the remote location. If so, then the call will be connected to the new location in a step 1320. If, however, the caller is not authorized to interrupt the user at the remote location, then in a step 1318 the caller will be sent to the user's voice mail.

A flowchart illustrating yet another alternate embodiment of a process according to the present invention is shown in FIG. 20. In particular, in a step 1402 the TOL server 804 receives a telephone call. In a step 1404, the destination number is checked. In a step 1406, the calendar is accessed, and in a step 1408, it is determined whether or not the user is in the office or at a remote location. If the user is in the office, then in a step 1410, the call is connected. If, however, the user is not in the office, then the user's location is determined from the calendar in a step 1412. In a step 1414, caller identification information, if any, is checked. If the caller-ID information is provided, it is determined in a step 1416 whether or not the caller is authorized to interrupt at the changed location. If the caller is not authorized to interrupt the user at the remote location, then in a step 1424, the caller is sent to voice mail. If the caller is authorized to interrupt the user at the remote location, the caller may be given the option, in a step 1418, to interrupt the user. In a step 1422, the system determines whether the caller has executed the option. If the caller has instead chosen voice mail, then in a step 1424, the caller is sent to voice mail. Otherwise, the caller may be connected to the user in a step 1426.

Another feature of the present invention is enhanced call-back. In particular, according to an embodiment of the invention, the caller can use the window 1250 of FIG. 13C to provide a call back reminder. For example, if the caller is unable to reach the user, the caller can select the call back information window 1250 of his calendar program. The caller can identify a call back destination in the window 1252, a subject in the window 1254, and additional remarks in the window 1256. Later, the calendar program will generate a reminder, i.e., a pop-up window will appear on the caller's screen, giving the caller the option to call back or try again.

Figure 13C:
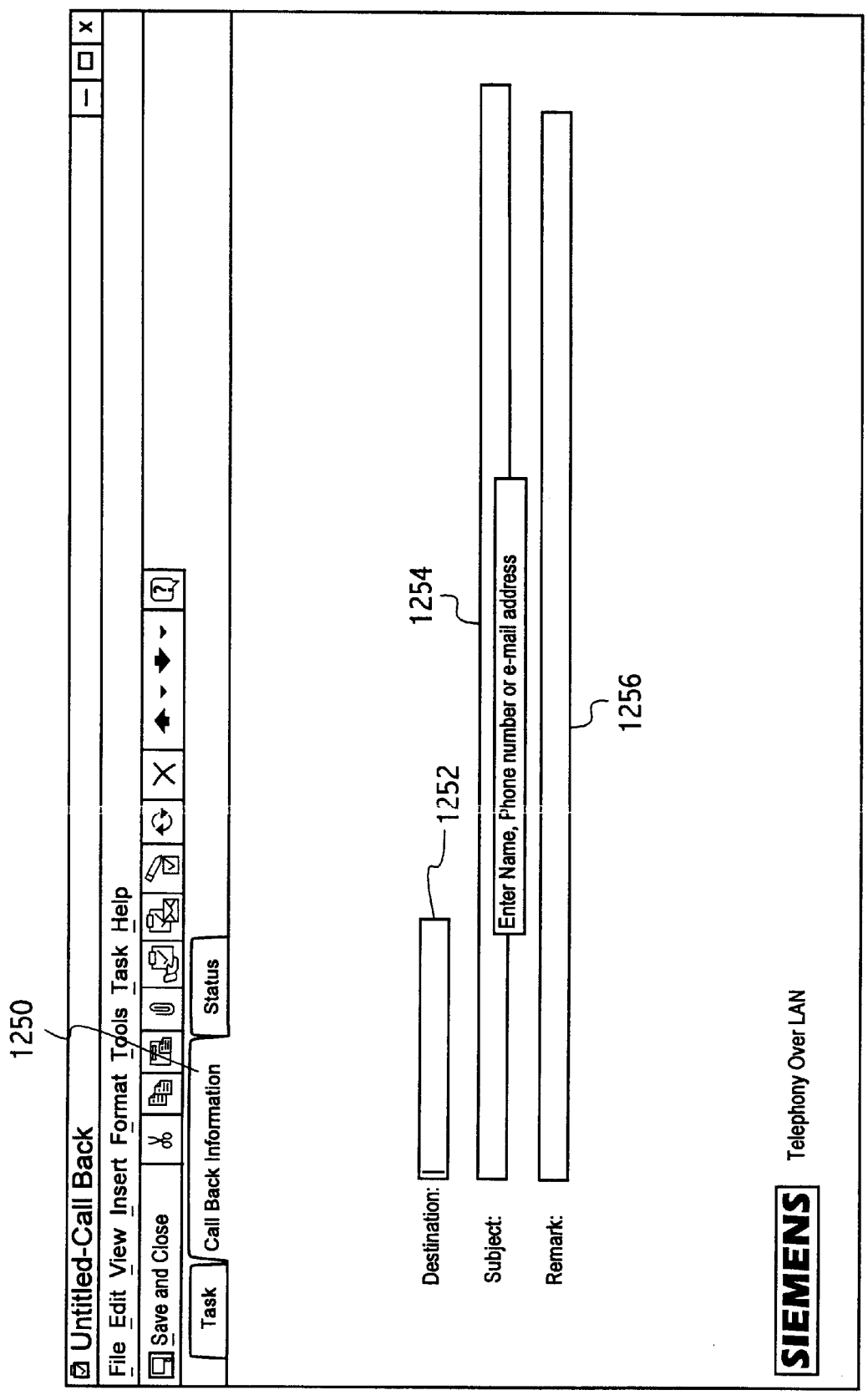
Figure 13D:
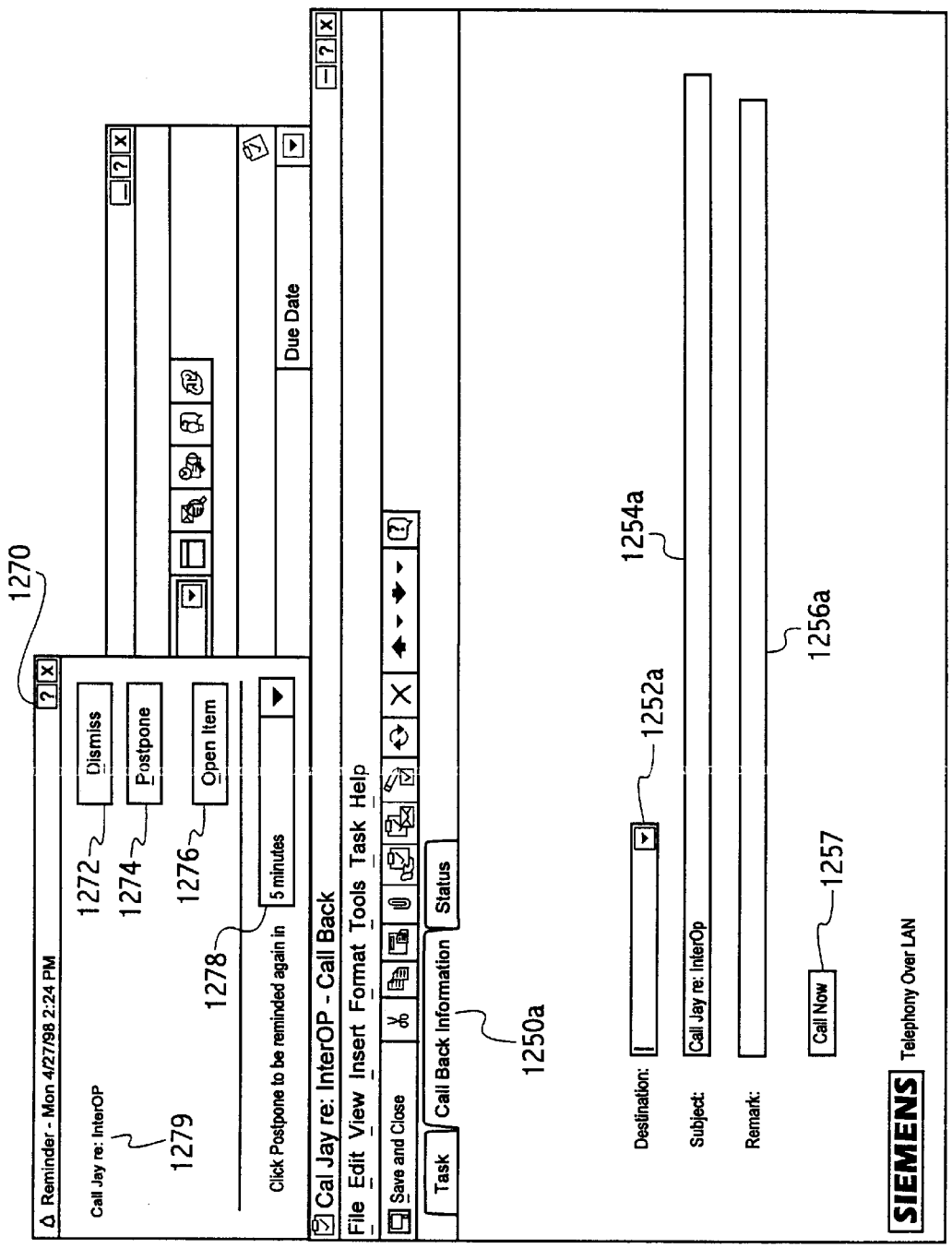
Figure 13E:
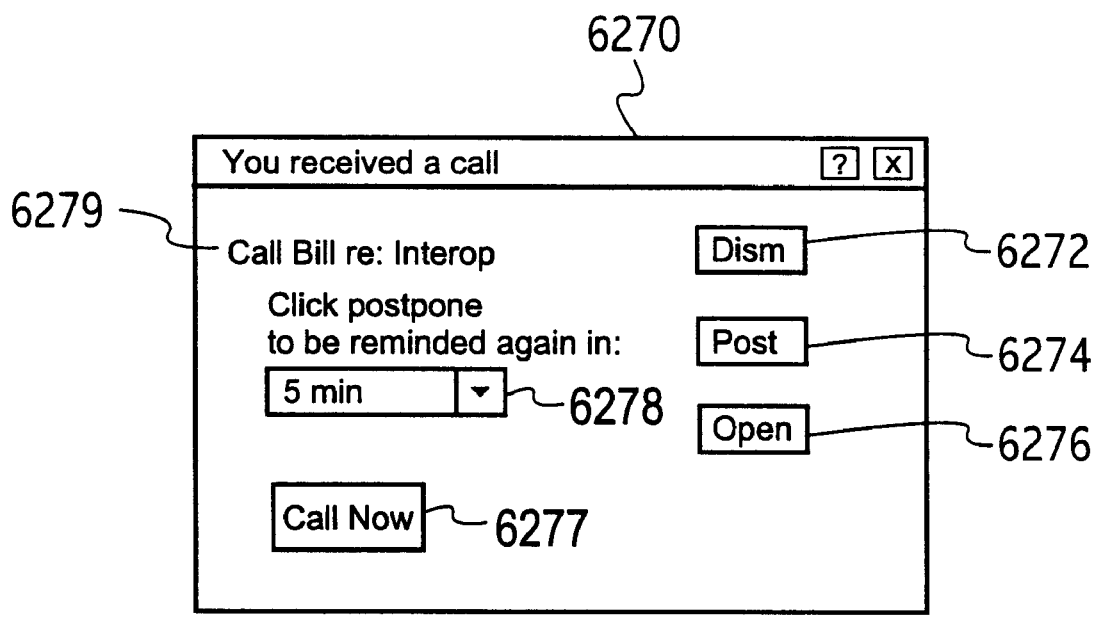

For example, turning now to FIG. 13D, a reminder pop-up window 1270 is shown, in conjunction with a call back information window 1250a. As shown, the caller entered "Call Jay re: Interop" in the subject window 1254 (FIG. 13C). This information appears in the subject window 1254a of FIG. 13D. A predetermined time after the caller hung up initially, the reminder window 1270 appears. As illustrated, the reminder window 1270 includes a dismiss button 1272, a postpone button 1274, an open item button 1276, and a reminder time set pull-down window 1278. In addition, text 1279 may be displayed, corresponding to the text entered in the subject window 1254a.

When presented with the reminder window 1270, the caller can dismiss the reminder, postpone the reminder for another time (to be reminded at a time set in the pull down window 1278), a click "open" to reveal the call-back information window 1250a. The user can then click the "call now" button 1257 to call back immediately, the system having stored "Jay's" number when the reminder information was entered.

Figures 21B, 21C:
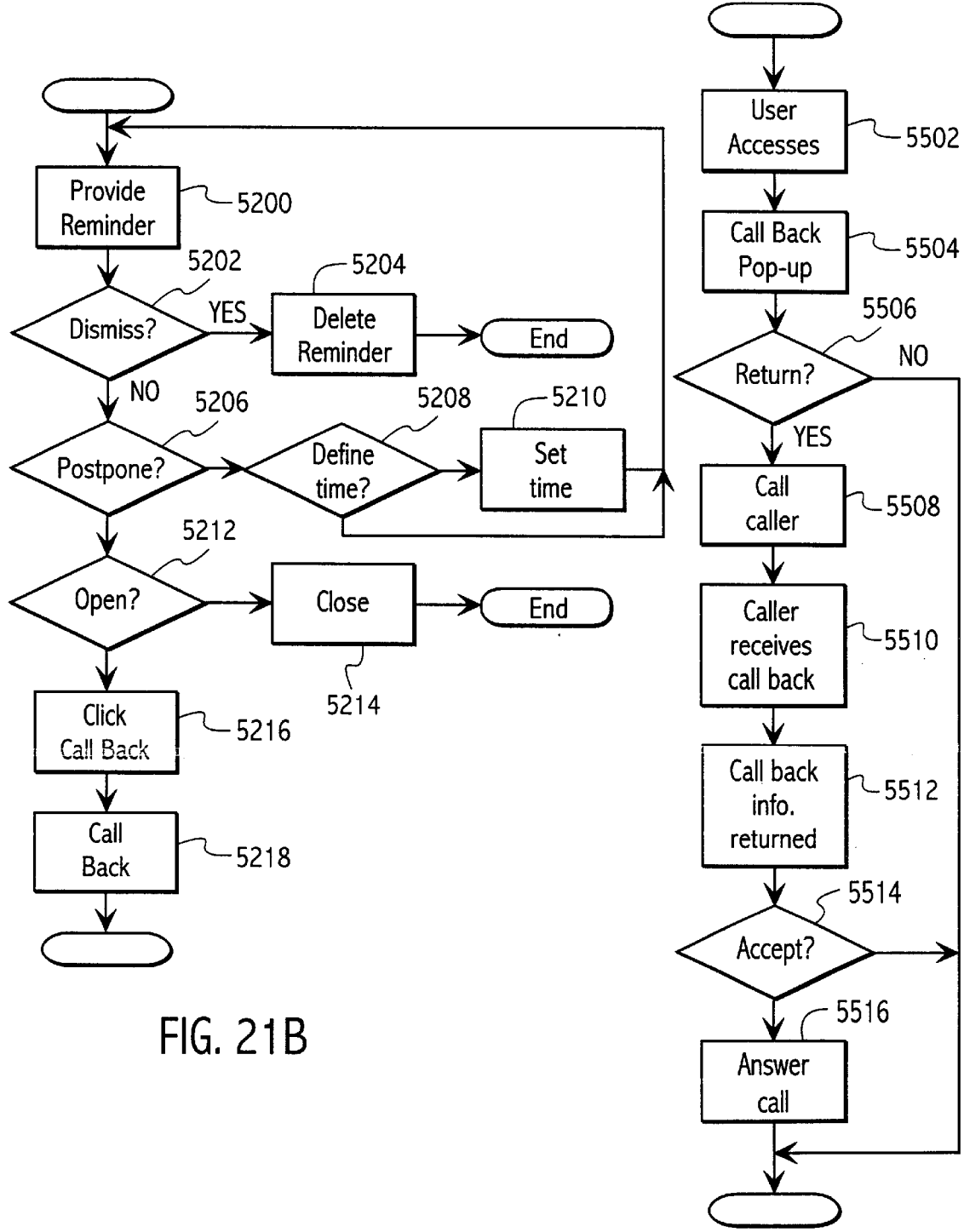

This feature is explained in greater detail with reference to FIGS. 21A and 21B. In particular, in a step 8002, the user receives a call from the caller. If the user is unavailable, as determined in a step 8004, the TOL server 804 provides the caller with the option to set call back parameters, in a step 8006. For example, the user may be unavailable generally, or unavailable only to a particular caller. If the caller does not wish to set call back, the call terminates in a step 8010. If, however, call back is to be set, the caller sets the call back information in a step 8008. As discussed above, setting the call back information may include keying in information in one or more of the information fields, such as the destination window 1252, a subject window 1254, and remarks window 1256 (FIG. 13C). This information is then received by and stored by the TOL server. The call is then terminated, in a step 8010. It is noted that the call-back reminder may be set after the call terminates. It is further noted that, by virtue of the call, the destination phone number is already known and may automatically be inserted in the window 1252.

A predetermined time after the caller has set the call-back information, the reminder window 1217 will pop-up, from the calendar program, in a step 5200. If the caller clicks the dismiss button 1272, in a step 5202, then the calendar will delete the reminder in a step 5204. If the caller instead clicks the postpone button 5206, the system may employ the default time (step 5208), or the caller may set a new postpone time, in a step 5210. Alternatively, the caller may click the open button 1276, in a step 5212, thereby causing the window 1250*a* to appear. The caller may then click "call now" in a step 5216 and the call will be retrieved in a step 5218.

In an alternative embodiment, the call-back information keyed in by the caller may be transmitted to the user, for example, by e-mail. This causes a window 6270 to pop up at the user's (called party's) computer. The window 6270 is generally similar to the caller's reminder window 1270. Brief text 6279 identifying the caller is provided. The called party is given the option of dismissing the reminder using button 6272, or postponing the call using the button 6274 and window 6278. Finally, the user can call back using the button 6277 or open and read further, using the button 6276.

Figure 13F:
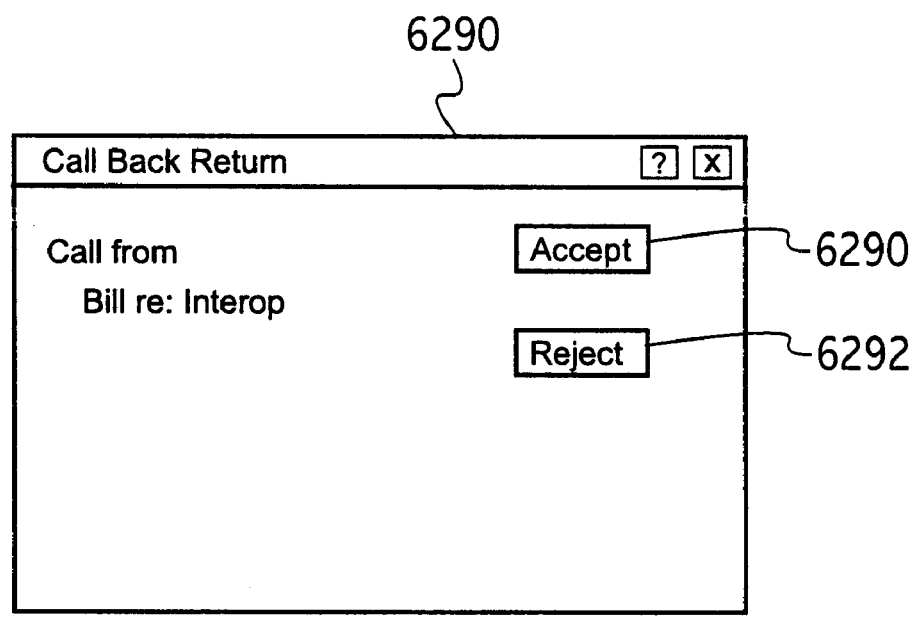

When the user (called party) returns to his work station, the user can access his telephony application, in a step 5502. For example, the call back pop-up window 6270 may be displayed, in a step 5504. As discussed above, the user may dismiss, or postpone the call, or may call back. The call-back pop-up window 6270 may display the information keyed in by any callers who have requested call back. Alternatively, this information may be available from a separate window accessible by clicking the button 6276. Such a window may be similar to the window 1250. Thus, for example, the identity of the caller, his phone number, and the subject and remarks may be provided. In a step 5506, the user may be given the option of returning the call. If the user accepts, then the caller is called, in a step 5508. In a step 5510, the caller receives the call back. In a step 5512, he receives information concerning his returned call. For example, information such as the identity of the called party and the time of the original call may be provided via another call back pop-up window. For example, the window 6290 (FIG. 13F) shows the identify of the user (provided, for example, from user ID information), and function buttons 6290, 6292, to allow the caller to accept or reject the call back, respectively. In a step 5514, the caller is given the option of accepting the call back call, for example, by clicking 6290. If the caller refuses, by clicking 6292, the session terminates. If the caller accepts, then in a step 5516, the call is completed.

The invention described in the above detailed description is not intended to be limited to the specific form set forth herein, but on the contrary, it is intended to cover such alternatives, modifications, and equivalents as can reasonably be included within the spirit and scope of the appended claims.

What is claimed is:

1. A system for routing telephone calls, comprising:
   a local area network;
   a plurality of workstations coupled to said local area network, said plurality of workstations adapted for voice communication over said local area network;
   means for setting one or more selected time periods; and
   means for routing telephone calls to particular workstations for a user based on said one or more selected time periods;
   wherein said setting means is accessible via any of said plurality of workstations.

2. A system according to claim 1, wherein said setting means includes means for identifying one or more callers whose calls may be routed during said one or more selected time periods.

3. A system according to claim 2, wherein said routing means includes means for routing selected calls responsive to said identifying means during said one or more selected time periods.

4. A system according to claim 1, wherein said setting means includes a Web browser.

5. A system according to claim 1, wherein said setting means includes a local application program.

6. A system according to claim 1, wherein said setting means includes means for accessing a user calendar.

7. A system according to claim 2, wherein said routing means includes means for providing call back to a caller whose call may not be routed during said one or more predetermined time periods.

8. A system according to claim 7, wherein said routing means includes means for accepting a call back.

9. A system according to claim 1, including means for routing said telephone calls to a called party's voice mail.

10. A system according to claim 1, including means for providing a caller of said user with a reminder to call back said user if said user is unavailable.

11. A telecommunications system, comprising:
    a local area network;
    a plurality of workstations coupled to said packet network, said plurality of workstations adapted for telephone calls over said local area network;
    means for providing user scheduling information; and
    means for routing one or more telephone calls based on said user scheduling information;
    wherein said providing means is accessible via any of said plurality of workstations.

12. A telecommunications system according to claim 11, said routing means including means for reading caller identification information and routing said one or more telephone calls based on said caller ID information.

13. A telecommunications system according to claim 11, said user scheduling information including date information.

14. A telecommunications system according to claim 13, said user scheduling information including time of day information.

15. A telecommunication system according to claim 12, said routing means including means for providing call back to a caller whose call is identified as not being routable.

16. A telecommunication system according to claim 15, said providing means including means for accepting or rejecting a called back call.

17. A method for routing telephone calls in one or more networks, one of said networks comprising a local area network having multiple workstations adapted for handling telephone calls, the method comprising:
    setting one or more selected time periods; and
    routing telephone calls to particular workstations for a user based on said one or more selected time periods;
    wherein said setting comprises setting said one or more time periods via any of said plurality of workstations.

18. A method according to claim 17, wherein said setting includes identifying one or more callers whose calls may be routed during said one or more selected time periods.

19. A method according to claim 18, wherein said routing includes routing selected calls responsive to said identifying during said one or more selected time periods.

20. A method according to claim 17, wherein said setting includes using a Web browser.

21. A method according to claim 17, wherein said setting includes using a local application program.

22. A method according to claim 17, wherein said setting includes accessing a user calendar.

23. A method according to claim 18, wherein said routing includes providing call back to a caller whose call may not be routed during said one or more predetermined time periods.

24. A method according to claim 23, wherein said routing includes accepting a call back.

25. A method according to claim 18, including providing said one or more callers with a call back reminder after said one or more callers have been disconnected.

* * * * *